(12) United States Patent
Taguchi

(10) Patent No.: US 7,052,534 B2
(45) Date of Patent: May 30, 2006

(54) INK FOR INKJET RECORDING, INK SET FOR INKJET RECORDING AND INKJET RECORDING METHOD

(75) Inventor: Toshiki Taguchi, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/617,818

(22) Filed: Jul. 14, 2003

(65) Prior Publication Data

US 2004/0011247 A1 Jan. 22, 2004

(30) Foreign Application Priority Data

Jul. 12, 2002 (JP) .................. P. 2002-204171

(51) Int. Cl.
*C09D 11/00* (2006.01)
*G01D 11/00* (2006.01)

(52) U.S. Cl. .............. 106/31.27; 106/31.43; 106/31.46; 106/31.49; 106/31.58; 347/100

(58) Field of Classification Search ........... 106/31.27, 106/301.43, 31.46, 31.49, 31.58; 347/100
See application file for complete search history.

(56) References Cited

U.S. PATENT DOCUMENTS

| | | | | |
|---|---|---|---|---|
| 6,015,455 A * | 1/2000 | Yano et al. | ............... | 106/31.58 |
| 6,048,390 A * | 4/2000 | Yano et al. | ............... | 106/31.43 |
| 6,100,315 A * | 8/2000 | Kitamura et al. | ............ | 523/160 |
| 6,682,590 B1 * | 1/2004 | Omatsu et al. | ............. | 106/31.5 |
| 6,695,898 B1 * | 2/2004 | Momose | ................... | 106/31.43 |
| 6,695,900 B1 * | 2/2004 | Momose | ................... | 106/31.75 |
| 2001/0023267 A1 | 9/2001 | Ishizuka et al. | | |
| 2002/0038614 A1 * | 4/2002 | Momose | ................... | 106/31.75 |
| 2003/0097959 A1 * | 5/2003 | Omatsu et al. | ........... | 106/31.43 |

FOREIGN PATENT DOCUMENTS

| | | |
|---|---|---|
| EP | 0 911 374 A | 4/1999 |
| EP | 1 004 641 A | 5/2000 |
| EP | 1 193 078 A | 4/2002 |
| EP | 1 251 154 A | 10/2002 |
| EP | 1 340 796 A | 9/2003 |
| WO | WO 00/04104 A | 1/2000 |

* cited by examiner

*Primary Examiner*—J. A. Lorengo
*Assistant Examiner*—Veronica F. Faison
(74) *Attorney, Agent, or Firm*—Sughrue Mion, PLLC

(57) ABSTRACT

Ink for inkjet recording comprises a dye, water, a water-miscible organic solvent and a precursor of acids, and thereby is rendered resistant to image blur even under a high humidity condition, an ink set including such ink, and an inkjet recording method, in which such ink or such an ink set is used.

12 Claims, No Drawings

INK FOR INKJET RECORDING, INK SET FOR INKJET RECORDING AND INKJET RECORDING METHOD

FIELD OF THE INVENTION

The present invention relates to inkjet recording ink, inkjet recording ink set, and an inkjet recording method.

BACKGROUND OF THE INVENTION

With the recent popularization of personal computers, inkjet printers have been widely used in not only offices but also homes for producing printed records on paper, films or fabrics.

An inkjet recording system includes a method of jetting liquid droplets under pressure applied thereto by an piezoelectric element, a method of jetting liquid droplets by thermal evolution of bubbles in ink, a method of utilizing ultrasonic waves or a method of sucking and jetting liquid droplets by electrostatic force. As ink compositions for these inkjet recording methods, water-based ink, oil-based ink and solid (waxy) ink are usable. Now, water-based ink is the mainstream of inkjet recording ink from the viewpoints of production, handling, odor and safety.

The ink compositions for inkjet recording are required to have a variety of properties including good hues, high fastness to light, heat, air, water and chemicals, firm fixation to image-receiving materials and resistance to blurring thereon, excellent keeping quality, no toxicity, high purity and low manufacturing cost. For satisfying these requirements, various ideas have been applied to dyes and pigments as coloring agents and other additives, but further improvement is desirable.

For instance, it is difficult to achieve both hue and fastness at the levels required for inkjet recording ink by use of well-known dyes and pigments to which color index (C.I.) numbers are assigned. Hitherto, the Inventors have pursued studies of fast dyes having good hues and proceeded with the development of coloring agents well suited for inkjet recording. And it has been found that, while compounds capable of functioning as water-soluble dyes generally contain water-soluble groups as their substituents and an increase in number of these water-soluble groups enables enhancement of ink stability, the images formed with the ink stabilized in such a way have a drawback of tending to become blurred under high humidity conditions.

SUMMARY OF THE INVENTION

Therefore, a problem to be solved by the invention is to provide an inkjet recording ink, an inkjet ink set and an inkjet recording method which hardly cause the ink images to become blurred even under high humidity conditions.

The aforesaid problem is solved by the ink and the ink set for inkjet recording and the inkjet recording method defined in the followings, respectively.

(1) An ink for inkjet recording, comprising a dye, water, a water-miscible organic solvent and a precursor of acid.

(2) The Ink for inkjet recording according to the item (1), wherein the precursor of acid is a compound showing no acidity at the time of a preparation and storage of the ink, but capable of releasing acids by a reaction after aging or printing, or capable of rendering the ink system acidic as a result of the reaction.

(3) The Ink for inkjet recording according to the item (1), wherein the precursor of acid includes at least one of compounds represented by the following formulae (1) to (10):

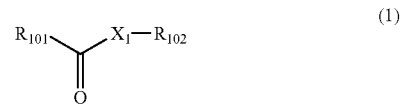

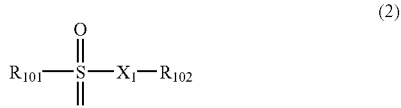

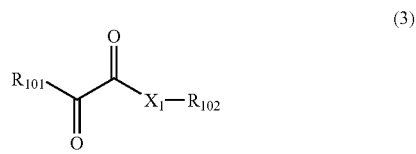

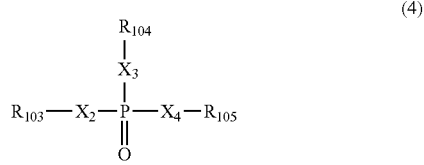

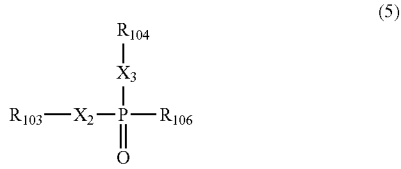

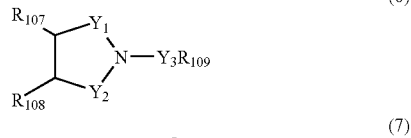

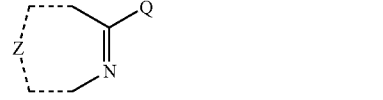

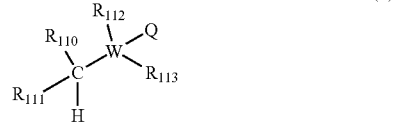

wherein $R_{101}$ represents an alkyl group, an alkenyl group, an alkynyl group, an aryl group, a heterocyclic group, an amino group, an alkoxy group, an aryloxy group, an alkylthio group or an arylthio group, and the groups may have a substituent;

$R_{102}$ to $R_{106}$ and $R_{109}$ each represent an alkyl group, an alkenyl group, an alkynyl group, an aryl group or heterocyclic group, and the groups may have a substituent;

$R_{107}$ and $R_{108}$ each represent a hydrogen atom, a chemical bond forming a double bond by being linked together, a halogen atom, an alkyl group, an alkenyl group, an alkynyl group, an aryl group or a heterocyclic group, and the groups may have a substituent, and two of $R_{107}$ and $R_{108}$ may form a ring by combining with each other;

$Y_1$ to $Y_3$ each represent a carbonyl group, a sulfonyl group, or a group represented by $PO(R_{120})R_{121}$; $R_{120}$ and $R_{121}$ each represent an alkyl group, an aryl group, a heterocyclic group, an amino group, an alkoxy group, an aryloxy group, an alkylthio group or an arylthio group;

$Y_1$ to $Y_3$ each represent a carbonyl group, a sulfonyl group, or a group represented by —$PO(R_{120})R_{121}$; $R_{120}$ and $R_{121}$ each represent an alkyl group, an aryl group, an aryl group, a heterocyclic group, an amino group, an alkoxy group, an aryloxy group, an alkylthio group or an arylthio group;

Z represents atoms capable of forming an aromatic heterocyclic ring; Q represents a halogen atom, an alkoxy group, an aryloxy group, an alkylthio group, an arylthio group, an amino group, an acyloxy group, an alkylsulfonyloxy group or an arylsulfonyloxy group:

W represents a carbon atom or a nitrogen atom; Q has the same definition as described above; $R_{110}$ and $R_{111}$ each represent a hydrogen atom, a halogen atom, an alkyl group, an aryl group, a heterocyclic group, an amino group, an alkoxy group, an aryloxy group, an alkylthio group, an arylthio group, an acyl group, an alkylsulfonyl group or an arylsulfonyl group;

$R_{112}$ and $R_{113}$ each represent a hydrogen atom, a halogen atom, or an alkyl group, an aryl group, a heterocyclic group, an alkoxy group, an aryloxy group, an alkylthio group, an arylthio group, an acyl group, an alkylsulfonyl group or an arylsulfonyl group;

Q has the same definition as described above; $R_{114}$ represents an alkyl group, an aryl group, a heterocyclic group, an acyl group, an alkylsulfonyl group, an arylsulfonyl group, a phosphoric acid group, an alkylphosphonic acid group, an arylphosphonic acid group, a dialkylphosphonic acid group or a diarylphosphonic acid group;

$R_{115}$ and $R_{116}$ each represent a hydrogen atom, a halogen atom, an alkyl group, an aryl group, a heterocyclic group, an amino group, an alkoxy group, an aryloxy group, an alkylthio group, an arylthio group, an acyl group, an alkylsulfonyl group or an arylsulfonyl group;

Q has the same definition as described above; $R_{117}$ and $R_{118}$ each represent a hydrogen atom, a halogen atom, an alkyl group, an aryl group, a heterocyclic group, an amino group, an alkoxy group, an aryloxy group, an alkylthio group, an arylthio group, an acyl group, an alkylsulfonyl group or an arylsulfonyl group.

(4) The Ink for inkjet recording according to the item (1), which comprises the precursor of acid in amount of 0.01 to 20 wt %.

(5) The Ink for inkjet recording according to the item (1), which further comprises a surfactant.

(6) The Ink for inkjet recording according to the item (1), which is an aqueous solution-type ink, in which the dye is a water-soluble dye.

(7) An ink set comprising the ink described in any one of the items (1) to (6).

(8) An inkjet recording method, which comprises recording an image with an inkjet printer using the ink described in any one of the items (1) to (6) or the ink set described in the item (7).

DETAILED DESCRIPTION OF THE INVENTION

The invention is described below in detail.

The present ink for inkjet recording is characterized by containing a precursor of acids.

The term "a precursor of acids" is intended to include compounds showing no acidity at the time of preparation or storage of ink but capable of releasing acids by reaction after aging or printing or capable of rendering the ink system acidic as a result of the reaction. These compounds are illustrated with their respective general formulae on a function-by-function basis.

In the first place, esters, amides and imides represented by the following formulae (1) to (6), which can release carboxylic acids by hydrolysis, can be given as examples of precursors of acids.

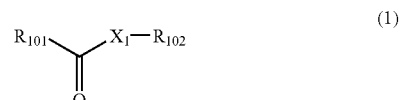

(1)

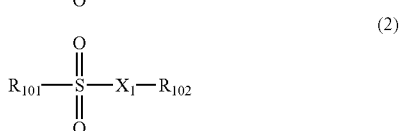

(2)

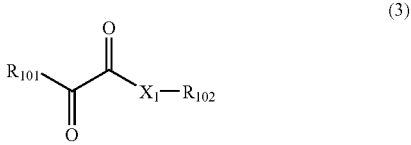

(3)

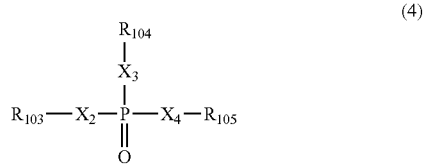

(4)

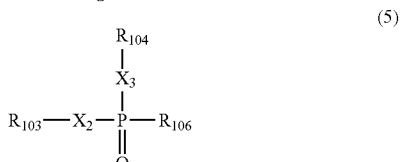

(5)

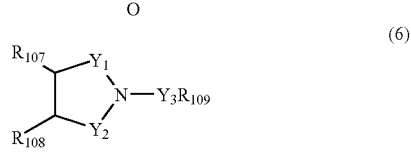

(6)

In the above formulae, $R_{101}$ represents a group selected from alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), alkenyl groups (preferably 2–20C, far preferably 2–12C, particularly preferably 2–8C, alkenyl groups, such as vinyl, allyl, 2-butenyl and 3-pentenyl), alkynyl groups (preferably 2–20C, far preferably 2–12C, particularly preferably 2–8C, alkynyl groups, such as propargyl and 3-pentynyl), aryl groups (preferably 6–30C, far preferably 6–20C, particularly preferably 6–12C, aryl groups, such as phenyl, p-methylphenyl and naphthyl), heterocyclic groups (preferably 1–20C, far preferably 0–12C, particularly preferably 0–6C, heterocyclic groups, such as pyridyl, pyrazyl, imidazolyl, thenoyl, pyrimidyl, triazinyl and quinolyl), amino groups (preferably 0–20C, far preferably 0–12C, particularly preferably 0–6C, amino groups, such as amino, methylamino, dimethylamino, diethylamino, diphenylamino, dibenzylamino and N-methylanilino), alkoxy groups (preferably 1–20C, far preferably 1–12C, particularly preferably 1–8C, alkoxy groups, such as methoxy, ethoxy and butoxy), aryloxy groups (preferably 6–20C, far preferably 6–16C, particularly preferably 6–12C, aryloxy groups, such as phenyloxy and 2-naphthyloxy), alkylthio groups (preferably 1–20C, far preferably 1–16C, particularly preferably 1–12C, alkylthio groups, such as methylthio and ethylthio) or arylthio groups (preferably 6–20C, far preferably 6–16C, particularly preferably 6–12C, arylthio groups, such as phenylthio). These groups may have substituents. Of these groups, alkyl groups, aryl groups and heterocyclic groups, especially those substituted with electron attracting groups, are preferred as $R_{101}$.

$R_{102}$ to $R_{106}$ and $R_{109}$ each represent a group selected from alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), alkenyl groups (preferably 2–20C, far preferably 2–12C, particularly preferably 2–8C, alkenyl groups, such as vinyl, allyl, 2-butenyl and 3-pentenyl), alkynyl groups (preferably 2–20C, far preferably 2–12C, particularly preferably 2–8C, alkynyl groups, such as propargyl and 3-pentynyl), aryl groups (preferably 6–30C, far preferably 6–20C, particularly preferably 6–12C, aryl groups, such as phenyl, p-methylphenyl and naphthyl) or heterocyclic groups (preferably 1–20C, far preferably 0–12C, particularly preferably 0–6C, heterocyclic groups, such as pyridyl, pyrazyl, imidazolyl, thenoyl, pyrimidyl, triazinyl and quinolyl). These groups may have substituents. Of these groups, alkyl groups, aryl groups and heterocyclic groups, especially those substituted with electron attracting groups, are preferred as each of $R_{102}$ to $R_{106}$ and $R_{109}$.

$R_{107}$ and $R_{108}$ represent hydrogen atoms, chemical bonds forming a double bond by being linked together, halogen atoms, or groups selected from alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), alkenyl groups (preferably 2–20C, far preferably 2–12C, particularly preferably 2–8C, alkenyl groups, such as vinyl, allyl, 2-butenyl and 3-pentenyl), alkynyl groups (preferably 2–20C, far preferably 2–12C, particularly preferably 2–8C, alkynyl groups, such as propargyl and 3-pentynyl), aryl groups (preferably 6–30C, far preferably 6–20C, particularly preferably 6–12C, aryl groups, such as phenyl, p-methylphenyl and naphthyl) or heterocyclic groups (preferably 1–20C, far preferably 0–12C, particularly preferably 0–6C, heterocyclic groups, such as pyridyl, pyrazyl, imidazolyl, thenoyl, pyrimidyl, triazinyl and quinolyl). Two substituents $R_{107}$ and $R_{108}$ may form a ring by combining with each other. The groups as recited above may have substituents.

$X_1$ to $X_4$ each represent an oxygen atom, a nitrogen atom, a sulfur atom or a group represented by —N($R_{119}$)—O— or —O—N($R_{119}$)—. Herein, $R_{119}$ represents a hydrogen atom, or a group selected from alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), aryl groups (preferably 6–30C, far preferably 6–20C, particularly preferably 6–12C, aryl groups, such as phenyl, p-methylphenyl and naphthyl) or heterocyclic groups (preferably 1–20C, far preferably 0–12C, particularly preferably 0–6C, heterocyclic groups, such as pyridyl, pyrazyl, imidazolyl, thenoyl, pyrimidyl, triazinyl and quinolyl).

$Y_1$ to $Y_3$ each represent a carbonyl group, a sulfonyl group, or a group represented by —PO($R_{120}$)$R_{121}$. Herein, $R_{120}$ and $R_{121}$ each represent a group selected from alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), aryl groups (preferably 6–30C, far preferably 6–20C, particularly preferably 6–12C, aryl groups, such as phenyl, p-methylphenyl and naphthyl), heterocyclic groups (preferably 1–20C, far preferably 0–12C, particularly preferably 0–6C, heterocyclic groups, such as pyridyl, pyrazyl, imidazolyl, thenoyl, pyrimidyl, triazinyl and quinolyl), amino groups (preferably 0–20C, far preferably 0–12C, particularly preferably 0–6C, amino groups, such as amino, methylamino, dimethylamino, diethylamino, diphenylamino, dibenzylamino and N-methylanilino), alkoxy groups (preferably 1–20C, far preferably 1–12C, particularly preferably 1–8C, alkoxy groups, such as methoxy, ethoxy and butoxy), aryloxy groups (preferably 6–20C, far preferably 6–16C, particularly preferably 6–12C, aryloxy groups, such as phenyloxy and 2-naphthyloxy), alkylthio groups (preferably 1–20C, far preferably 1–16C, particularly preferably 1–12C, alkylthio groups, such as methylthio and ethylthio) or arylthio groups (preferably 6–20C, far preferably 6–16C, particularly preferably 6–12C, arylthio groups, such as phenylthio).

In the second place, compounds represented by the following formula (7), which have structures equivalent to those of acid chlorides, such as a halogen attached to the carbon of C=N double bond, can be given as examples of a precursor of acids.

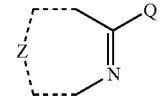

(7)

In the above formula, Z represents atoms capable of forming an aromatic heterocyclic ring. Q represents a halogen atom (e.g., fluorine, chlorine, bromine, iodine), an alkoxy group (containing preferably 1 to 20, far preferably 1 to 12, particularly preferably 1 to 8, carbon atoms, such as methoxy, ethoxy or butoxy), an aryloxy group (containing preferably 6 to 20, far preferably 6 to 16, particularly preferably 6 to 12, carbon atoms, such as phenyloxy or 2-naphthyloxy), an alkylthio group (containing preferably 1 to 20, far preferably 1 to 16, particularly preferably 1 to 12, carbon atoms, such as methylthio or ethylthio), an arylthio group (containing preferably 6 to 20, far preferably 6 to 16, particularly preferably 6 to 12, carbon atoms, such as phenylthio), an amino group (containing preferably 0 to 20, far preferably 0 to 12, particularly preferably 0 to 6, carbon atoms, such as amino, methylamino, dimethylamino, diethylamino, diphenylamino, dibenzylamino or N-methylanilino), an acyloxy group (containing preferably 2 to 20, far preferably 2 to 16, particularly preferably 2 to 10, carbon atoms, such as acetoxy or benzoyloxy), an alkylsulfonyloxy group (containing preferably 1 to 20, far preferably 1 to 16, particularly preferably 1 to 10, carbon atoms, such as methanesulfonyloxy or ethanesulfonyloxy) or an arylsulfonyloxy group (containing preferably 6 to 20, far preferably 6 to 16, particularly preferably 6 to 10, carbon atoms, such as benzenesulfonyloxy or p-toluenesulfonyloxy). Of these substituents, a halogen atom is preferred in particular as Q.

In the third place, compounds represented by the following formula (8), which can release acids by β-elimination, can be given as examples of a precursor of acids.

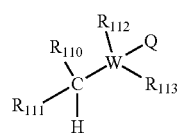
(8)

In the above formula, W represents a carbon atom or a nitrogen atom. Q has the same definition as in formula (7). $R_{110}$ and $R_{111}$ each represent a hydrogen atom, a halogen atom, or a group selected from alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), aryl groups (preferably 6–30C, far preferably 6–20C, particularly preferably 6–12C, aryl groups, such as phenyl, p-methylphenyl and naphthyl), heterocyclic groups (preferably 1–20C, far preferably 0–12C, particularly preferably 0–6C, heterocyclic groups, such as pyridyl, pyrazyl, imidazolyl, thenoyl, pyrimidyl, triazinyl and quinolyl), amino groups (preferably 0–20C, far preferably 0–12C, particularly preferably 0–6C, amino groups, such as amino, methylamino, dimethylamino, diethylamino, diphenylamino, dibenzylamino and N-methylanilino), alkoxy groups (preferably 1–20C, far preferably 1–12C, particularly preferably 1–8C, alkoxy groups, such as methoxy, ethoxy and butoxy), aryloxy groups (preferably 6–20C, far preferably 6–16C, particularly preferably 6–12C, aryloxy groups, such as phenyloxy and 2-naphthyloxy), alkylthio groups (preferably 1–20C, far preferably 1–16C, particularly preferably 1–12C, alkylthio groups, such as methylthio and ethylthio), arylthio groups (preferably 6–20C, far preferably 6–16C, particularly preferably 6–12C, arylthio groups, such as phenylthio), acyl groups (preferably 2–20C, far preferably 2–16C, particularly preferably 2–12C, acyl groups, such as acetyl and benzoyl), alkylsulfonyl groups (preferably 1–20C, far preferably 1–16C, particularly preferably 1–12C, alkylsulfonyl groups, such as methanesulfonyl and ethanesulfonyl) or arylsulfonyl groups (preferably 6–20C, far preferably 6–16C, particularly preferably 6–12C, arylsulfonyl groups, such as benzenesulfonyl). Of these groups, alkyl groups, aryl groups, heterocyclic groups, acyl groups, alkylsulfonyl groups and arylsulfonyl groups are preferred over the others.

$R_{112}$ and $R_{113}$ each represent a hydrogen atom, a halogen atom, or a group selected from alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), aryl groups (preferably 6–30C, far preferably 6–20C, particularly preferably 6–12C, aryl groups, such as phenyl, p-methylphenyl and naphthyl), heterocyclic groups (preferably 1–20C, far preferably 0–12C, particularly preferably 0–6C, heterocyclic groups, such as pyridyl, pyrazyl, imidazolyl, thenoyl, pyrimidyl, triazinyl and quinolyl), alkoxy groups (preferably 1–20C, far preferably 1–12C, particularly preferably 1–8C, alkoxy groups, such as methoxy, ethoxy and butoxy), aryloxy groups (preferably 6–20C, far preferably 6–16C, particularly preferably 6–12C, aryloxy groups, such as phenyloxy and 2-naphthyloxy), alkylthio groups (preferably 1–20C, far preferably 1–16C, particularly preferably 1–12C, alkylthio groups, such as methylthio and ethylthio), arylthio groups (preferably 6–20C, far preferably 6–16C, particularly preferably 6–12C, arylthio groups, such as phenylthio), acyl groups (preferably 2–20C, far preferably 2–16C, particularly preferably 2–12C, acyl groups, such as acetyl and benzoyl), alkylsulfonyl groups (preferably 1–20C, far preferably 1–16C, particularly preferably 1–12C, alkylsulfonyl groups, such as methanesulfonyl and ethanesulfonyl) or arylsulfonyl groups (preferably 6–20C, far preferably 6–16C, particularly preferably 6–12C, arylsulfonyl groups, such as benzenesulfonyl)

Preferably, $R_{112}$ and $R_{113}$ are each a hydrogen atom, an alkyl group, an aryl group, a heterocyclic group, an acyl group, an alkylsulfonyl group or an arylsulfonyl group.

Further, compounds represented by the following formula (9), which can produce the same effect as release of acids by releasing hard anions through nucleophilic substitution, are usable as precursors of acids.

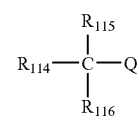
(9)

In the above formula, Q has the same definition as in formula (7). $R_{114}$ represents a group selected from alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), aryl groups (preferably 6–30C, far preferably 6–20C, particularly preferably 6–12C, aryl groups, such as phenyl, p-methylphenyl and naphthyl), heterocyclic groups (preferably 1–20C, far preferably 0–12C, particularly preferably 0–6C, heterocyclic groups, such as pyridyl, pyrazyl, imidazolyl, thenoyl, pyrimidyl, triazinyl and quinolyl), acyl groups (preferably 2–20C, far preferably 2–16C, particularly preferably 2–12C, acyl groups, such as acetyl and benzoyl), alkylsulfonyl groups (preferably 1–20C, far preferably 1–16C, particularly preferably 1–12C, alkylsulfonyl groups, such as methanesulfonyl and ethanesulfonyl), arylsulfonyl groups (preferably 6–20C, far preferably 6–16C, particularly preferably 6–12C, arylsulfonyl groups, such as benzenesulfonyl), phosphoric acid groups, alkylphosphonic acid groups, arylphosphonic acid groups, dialkylphosphonic acid groups, or diarylphosphonic acid groups. Of these groups, aryl groups, heterocyclic groups, acyl groups, alkylsulfonyl groups and arylsulfonyl groups are preferred over the others.

$R_{115}$ and $R_{116}$ each represent a hydrogen atom, a halogen atom, or a group selected from alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), aryl groups (preferably 6–30C, far preferably 6–20C, particularly preferably 6–12C, aryl groups, such as phenyl, p-methylphenyl and naphthyl), heterocyclic groups (preferably 1–20C, far preferably 0–12C, particularly preferably 0–6C, heterocyclic groups, such as pyridyl, pyrazyl, imidazolyl, thenoyl, pyrimidyl, triazinyl and quinolyl), amino groups (preferably 0–20C, far preferably 0–12C, particularly preferably 0–6C, amino groups, such as methylamino, dimethylamino, diethylamino, diphenylamino, dibenzylamino and N-methylanilino), alkoxy groups (preferably 1–20C, far preferably 1–12C, particularly preferably 1–8C, alkoxy groups, such as methoxy, ethoxy and butoxy), aryloxy groups (preferably 6–20C, far preferably 6–16C, particularly preferably 6–12C, aryloxy groups, such as phenyloxy and 2-naphthyloxy), alkylthio groups (preferably 1–20C, far preferably 1–16C, particularly preferably 1–12C, alkylthio groups, such as methylthio and ethylthio), arylthio groups (preferably 6–20C, far preferably 6–16C, particularly preferably 6–12C, arylthio groups, such as phenylthio), acyl groups (preferably 2–20C, far preferably 2–16C, particularly preferably 2–12C, acyl groups, such as acetyl and benzoyl), alkylsulfonyl groups (preferably 1–20C, far preferably 1–16C, particularly preferably 1–12C, alkylsulfonyl groups, such as methanesulfonyl and ethanesulfonyl) or arylsulfonyl groups (preferably 6–20C, far preferably 6–16C, particularly preferably 6–12C, arylsulfonyl groups, such as benzenesulfonyl). Preferably, $R_{115}$ and $R_{116}$ are each a hydrogen atom, a halogen atom, an alkyl group, an aryl group, a heterocyclic group, an acyl group, an alkylsulfonyl group or an arylsulfonyl group.

Furthermore, compounds represented by the following formula (10), which can release acid by exposure to light, are also usable.

(10)

In the above formula, Q has the same definition as in formula (7). $R_{118}$ and $R_{119}$ each represent a hydrogen atom, a halogen atom, or a group selected from alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), aryl groups (preferably 6–30C, far preferably 6–20C, particularly preferably 6–12C, aryl groups, such as phenyl, p-methylphenyl and naphthyl), heterocyclic groups (preferably 1–20C, far preferably 0–12C, particularly preferably 0–6C, heterocyclic groups, such as pyridyl, pyrazyl, imidazolyl, thenoyl, pyrimidyl, triazinyl and quinolyl), amino groups (preferably 0–20C, far preferably 0–12C, particularly preferably 0–6C, amino groups, such as methylamino, dimethylamino, diethylamino, diphenylamino, dibenzylamino and N-methylanilino), alkoxy groups (preferably 1–20C, far preferably 1–12C, particularly preferably 1–8C, alkoxy groups, such as methoxy, ethoxy and butoxy), aryloxy groups (preferably 6–20C, far preferably 6–16C, particularly preferably 6–12C, aryloxy groups, such as phenyloxy and 2-naphthyloxy), alkylthio groups (preferably 1–20C, far preferably 1–16C, particularly preferably 1–12C, alkylthio groups, such as methylthio and ethylthio), arylthio groups (preferably 6–20C, far preferably 6–16C, particularly preferably 6–12C, arylthio groups, such as phenylthio), acyl groups (preferably 2–20C, far preferably 2–16C, particularly preferably 2–12C, acyl groups, such as acetyl and benzoyl), alkylsulfonyl groups (preferably 1–20C, far preferably 1–16C, particularly preferably 1–12C, alkylsulfonyl groups, such as methanesulfonyl and ethanesulfonyl) or arylsulfonyl groups (preferably 6–20C, far preferably 6–16C, particularly preferably 6–12C, arylsulfonyl groups, such as benzenesulfonyl). Preferably, at least either $R_{117}$ or $R_{118}$ is an acyl group, an alkylsulfonyl group or an arylsulfonyl group and the remainder is a substituent selected from a halogen atom, an alkyl group, an aryl group, a heterocyclic group, an acyl group, an alkylsulfonyl group or an arylsulfonyl group.

Compounds developing acidity when released into the air and oxidized by oxygen can be used as the precursors of acids. Examples of such compounds include alhehydes as the reductants of carboxylic acids, and sulfinic acids and thiols as the reductants of sulfonic acids.

In addition, acid multiplication agents of the type which produce acids in succession can be used. Examples of such agents include those described in Ichimura et al., *Angew. Chem. Int. Ed.* 2000, 39, No. 19, 3425–3428.

Each of $R_{101}$ to $R_{121}$ in the foregoing formulae can have a substituent. Examples of such a substituent include alkyl groups (preferably 1–20C, far preferably 1–12C, particularly preferably 1–8C, alkyl groups, such as methyl, ethyl, iso-propyl, tert-butyl, n-octyl, n-decyl, n-hexadecyl, cyclopropyl, cyclopentyl and cyclohexyl), alkenyl groups (preferably 2–20C, far preferably 2–12C, particularly preferably 2–8C, alkenyl groups, such as vinyl, allyl, 2-butenyl and 3-pentenyl), alkynyl groups (preferably 2–20C, far preferably 2–12C, particularly preferably 2–8C, alkynyl groups, such as propargyl and 3-pentynyl), aryl groups (preferably 6–30C, far preferably 6–20C, particularly preferably 6–12C, aryl groups, such as phenyl, p-methylphenyl and naphthyl), amino groups (preferably 0–20C, far preferably 0–12C, particularly preferably 0–6C, amino groups, such as amino, methylamino, dimethylamino, diethylamino, diphenylamino and dibenzylamino), alkoxy groups (preferably 1–20C, far preferably 1–12C, particularly preferably 1–8C, alkoxy groups, such as methoxy, ethoxy and butoxy), aryloxy groups (preferably 6–20C, far preferably 6–16C, particularly preferably 6–12C, aryloxy groups, such as phenyloxy and 2-naphthyloxy), acyl groups (preferably 1–20C, far preferably 1–16C, particularly preferably 1–12C, acyl groups, such as acetyl, benzoyl, formyl and pivaroyl), alkoxycarbonyl groups (preferably 2–20C, far preferably 2–16C, particularly preferably 2–12C, alkoxycarbonyl groups, such as methoxycarbonyl and ethoxycarbonyl), aryloxycarbonyl groups (preferably 7–20C, far preferably 7–16C, particularly preferably 7–10C, aryloxycarbonyl groups, such as phenyloxycarbonyl), acyloxy groups (preferably 2–20C, far preferably 2–16C, particularly preferably 2–10C, acyloxy groups, such as acetoxy and benzoyloxy), acylamino groups (preferably 2–20C, far preferably 2–16C, particularly preferably 2–10C, acylamino groups, such as acetylamino and benzoylamino), alkoxycarbonylamino groups (preferably 2–20C, far preferably 2–16C, particularly preferably 2–12C, alkoxycarbonylamino groups, such as methoxycarbonylamino), aryloxycarbonylamino groups (preferably 7–20C, far preferably 7–16C, particularly preferably 7–12C, aryloxycarbonylamino groups, such as phenyloxycarbonylamino), sulfonylamino groups (preferably 1–20C, far preferably 1–16C, particularly preferably 1–12C, sulfonylamino groups, such as methanesulfonylamino and benzenesulfonylamino), sulfamoyl groups (preferably 0–20C, far preferably 0–16C, particularly preferably 0–12C, sulfamoyl groups, such as sulfamoyl, methylsulfamoyl, dimethylsulfamoyl and phenylsulfamoyl), carbamoyl groups (preferably 1–20C, far preferably 1–16C, particularly preferably 1–12C, carbamoyl groups, such as carbamoyl, methylcarbamoyl, diethylcarbamoyl and phenylcarbamoyl), alkylthio groups (preferably 1–20C, far preferably 1–16C, particularly preferably 1–12C, alkylthio groups, such as methylthio and ethylthio), arylthio groups (preferably 6–20C, far preferably 6–16C, particularly preferably 6–12C, arylthio groups, such as phenylthio), sulfonyl groups (preferably 1–20C, far preferably 1–16C, particularly preferably 1–12C, sulfonyl groups, such as mesyl and tosyl), sulfinyl groups (preferably 1–20C, far preferably 1–16C, particularly preferably 1–12C, sulfinyl groups, such as methanesulfinyl and benzenesulfinyl), ureido groups (preferably 1–20C, far preferably 1–16C, particularly preferably 1–12C, ureido groups, such as ureido, methylureido and phenylureido), phosphoric acid amide groups (preferably 1–20C, far preferably 1–16C, particularly preferably 1–12C, phosphoric acid amide groups, such as diethylphosphoric acid amide and phenylphosphoric acid amide groups), a hydroxyl group, a mercapto group, halogen atoms (e.g., fluorine, chlorine, bromine, iodine), a cyano group, a sulfo group, a carboxyl group, a nitro group, a hydroxamic acid group, a sulfino group, a hydrazino group, an imino group, heterocyclic groups (preferably 1–30C, far preferably 1–12C, heterocyclic groups containing nitrogen, oxygen or/and sulfur atoms, such as imidazolyl, pyridyl, quinolyl, furyl, thienyl, piperidyl, morpholino, benzoxazolyl, benzimidazolyl, benzothiazolyl, carbazolyl and aza-vinyl), and silyl groups (preferably 3–40C, far preferably 3–30C, particularly preferably 3–24C, silyl groups, such as trimethylsilyl and triphenylsilyl). These substituents each may be further substituted. When two or more substituents are present, they may be the same or different. In addition, they may form a ring by combining with each other, if possible.

Examples of precursors of acids which can be suitably used in the invention are illustrated below. As a matter of course, these examples should not be construed as limiting the scope of the invention in any way.

X-1
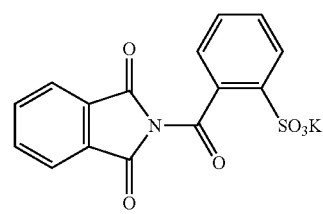

X-2
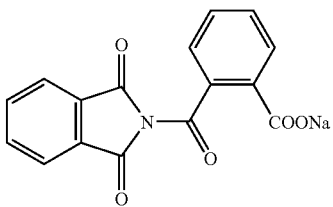

X-3
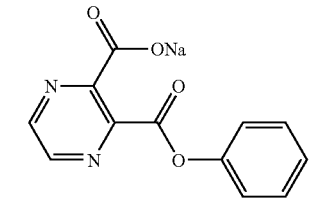

X-4
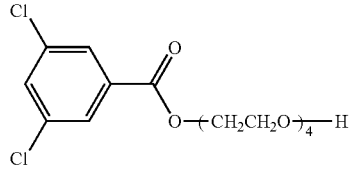

-continued

X-5
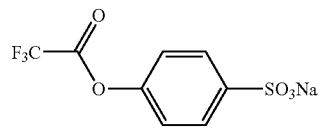

X-6
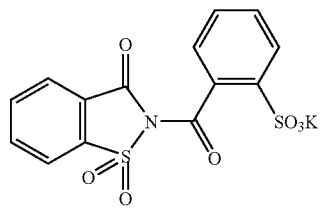

X-7
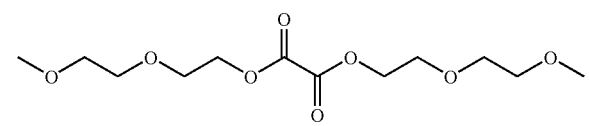

X-8
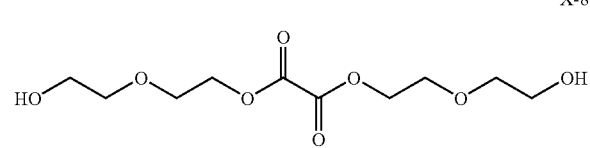

X-9
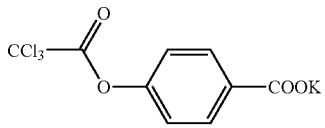

X-10
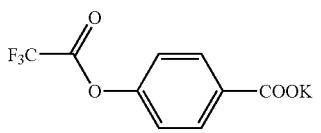

X-11
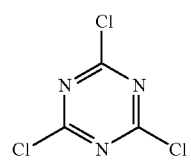

X-12
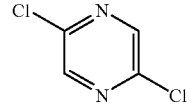

X-13
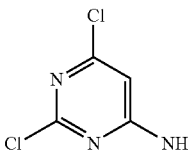

X-14
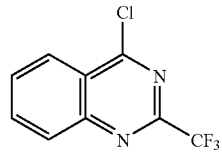

-continued

X-15 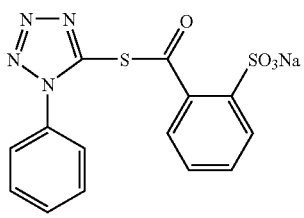

X-16 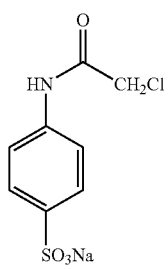

X-17 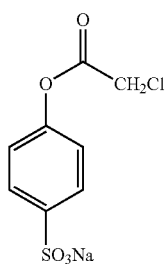

X-18 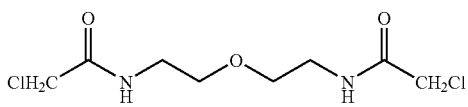

X-19 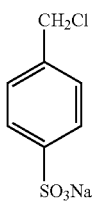

X-20 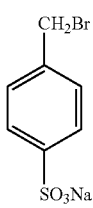

-continued

X-21 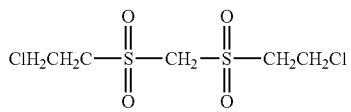

X-22 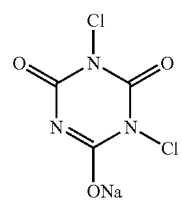

It is appropriate that the present precursors of acids be used in ink in a proportion of 0.01 to 20% by weight, preferably 0.1 to 10% by weight, far preferably 0.5 to 5% by weight.

Besides containing the precursors of acids, the present ink contains a dye, water and a water-miscible organic solvent. In particular, it is preferable that the present ink is aqueous solution-type ink based on the use of a water-soluble dye.

In the present ink, two or more of dyes may be used in combination for the purposes of producing full color images and adjusting color tone. The following are examples of dyes usable in the invention.

Examples of a yellow dye usable in the invention include arylazo or heterylazo dyes containing as coupling components phenols, naphthols, anilines, pyridones and open-chain active methylene compounds, respectively; azomethine dyes containing open-chain active methylene compounds as coupling components; methine dyes, such as benzylidene dyes and monomethineoxonol dyes; and quinone dyes, such as naphthoquinone dyes and anthraquinone dyes. As other types of dyes, quinophthalone dyes, nitro/nitroso dyes, acridine dyes and acridinone dyes are also usable. These dyes may be compounds capable of developing yellow only after partial dissociation of their chromophores. The counter cations of such compounds may be inorganic cations, such as alkali metal ions and ammonium ion, or organic cations such as pyridinium and quaternary ammonium ions, or polymer cations containing those cations as their partial structures.

Examples of a magenta dye usable in the invention include arylazo or heterylazo dyes containing as coupling components phenols, naphthols and anilines, respectively; azomethine dyes containing as coupling components pyrazolones and pyrazoloazoles, respectively; methine dyes, such as styryl dyes, merocyanine dyes and oxonol dyes; carbonium dyes such as diphenylmethane dyes, triphenylmethane dyes and xanthene dyes; dyes of quinone types such as naphthoquinone, anthraquinone and anthrapyridone; and condensed polycyclic dyes such as dioxadine dyes. These dyes may be compounds capable of developing magenta only after partial dissociation of their chromophores. The counter cations of such compounds may be inorganic cations, such as alkali metal ions and ammonium ion, or organic cations such as pyridinium and quaternary ammonium ions, or polymer cations containing those cations as their partial structures.

Exampels of a cyan dye usable in the invention include azomethine dyes, such as idoaniline dyes and indophenol dyes; polymethine dyes, such as cyanine dyes, oxonol dyes and merocyanine dyes; carbonium dyes, such as diphenylmethane dyes, triphenylmethane dyes and xanthene dyes; phthalocyanine dyes; anthraquinone dyes; arylazo or heterylazo dyes containing as coupling components phenols, naphthols and anilines, respectively; and indigo/thioindigo dyes. These dyes may be compounds capable of developing cyan only after partial dissociation of their chromophores. The counter cations of such compounds may be inorganic cations, such as alkali metal ions and ammonium ion, or organic cations such as pyridinium and quaternary ammonium ions, or polymer cations containing those cations as their partial structures.

Further, black dyes including polyazo dyes can be used in the invention.

In addition, water-soluble dyes such as direct dyes, acid dyes, food colors, basic dyes and reactive dyes can be used in combination with the dyes as recited above. Suitable examples of these dyes include:

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247, C.I. Direct Violet 7, 9, 47, 48, 51, 66, 90, 95, 98, 100 and 101, C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161 and 163, C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289 and 291, C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173 and 199, C.I. Acid Red 35, 42, 52, 57, 62, 80, 82, 111, 114, 118, 119, 127, 128, 131, 143, 151, 158, 249, 254, 257, 261, 263, 266, 289, 299, 301, 305, 336, 337, 361, 396 and 397, C.I. Acid Violet 5, 34, 43, 47, 48, 90, 103 and 126, C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222 and 227, C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290 and 326, C.I. Acid Black 24, 29, 48, 52:1 and 172, C.I. Reactive Red 3, 13, 17, 19, 21, 22, 23, 24, 29, 35, 37, 40, 41, 43, 45, 49 and 55, C.I. Reactive Violet 1, 3, 4, 5, 6, 7, 8, 9, 16, 17, 22, 23, 24, 26, 27, 33 and 34, C.I. Reactive Yellow 2, 3, 13, 14, 15, 17, 18, 23, 24, 25, 26, 27, 29, 35, 37, 41 and 42, C.I. Reactive Blue 2, 3, 5, 8, 10, 13, 14, 15, 17, 18, 19, 21, 25, 26, 27, 28, 29 and 38, C.I. Reactive Black 4, 5, 8, 14, 21, 23, 26, 31, 32 and 34, C.I. Basic Red 12, 13, 14, 15, 18, 22, 23, 24, 25, 27, 29, 35, 36, 38, 39, 45 and 46, C.I. Basic Violet 1, 2, 3, 7, 10, 15, 16, 20, 21, 25, 27, 28, 35, 37, 39, 40 and 48, C.I. Basic Yellow 1, 2, 4, 11, 13, 14, 15, 19, 21, 23, 24, 25, 28, 29, 32, 36, 39 and 40, C.I. Basic Blue 1, 3, 5, 7, 9, 22, 26, 41, 45, 46, 47, 54, 57, 60, 62, 65, 66, 69 and 71, and C.I. Basic Black 8.

Furthermore, pigments can also be used in combination with the dyes as recited above.

In the present ink, not only commercially available pigments but also pigments described in a considerable literature can be utilized. For instance, *Color Index* (compiled by The Society of Dyers and Colourists), *Kaitei Shinpan Ganryou Binran*, compiled by Nippon Ganryo Gijutsu Kyokai (1989), *Saishin Ganryo Oyo Gijutsu*, CMC Publishing Co., Ltd. (1986), *Insatsu Ink Gijutsu*, CMC Publishing Co., Ltd. (1984), and W. Herbst & K. Hunger, *Industrial Organic Pigments*, VCH Verlagsgesellschaft (1993) can be referred to. Examples of organic pigments usable in the invention include azo pigments (such as azo color lake, insoluble azo pigments, condensed azo pigments, chelate azo pigments), polycyclic pigments (such as phthalocyanine pigments, anthraquinone pigments, perylene and perynone pigments, indigo pigments, quinacridone pigments, dioxazine pigments, isoindolinone pigments, quinophthalone pigments, and diketopyrrolopyrrole pigments), lake pigments (color lakes of acid or basic dyes), and azine pigments. Examples of inorganic pigments usable in the invention include the yellow pigments of C.I. Pigment Yellow 34, 37, 42 and 53, the red pigments of C.I. Pigment Red 101 and 108, the blue pigments of C.I. Pigment Blue 27, 29 and 17:1, the black pigments of C.I. Pigment Black 7 and magnetite, and the white pigments of C.I. Pigment White 4, 6, 18 and 21.

Suitable examples of blue to cyan pigments having tones desirable for image formation include phthalocyanine pigments, indanthrone pigments of anthraquinone type (e.g., C.I. Pigment Blue 60) and triarylcarbonium pigments of lake pigment type. The most suitable ones of these pigments are phthalocyanine pigments (with preferable examples including copper phthalocyanines, such as C.I. Pigment Blue 15:1, 15:2, 15:3, 15:4 and 15:6, mono- to low-chlorinated copper phthalocyanines, the aluminum phthalocyanine pigments disclosed in European Patent No. 860475, the metal-free phthalocyanine of C.I. Pigment Blue 16 and phthalocyanines containing Zn, Ni and Ti as their respective central metals). Of these phthalocyanine pigments, C.I. Pigment Blue 15:3 and 15:4 and the aluminum phthalocyanine pigments are advantageous over the others.

Suitable examples of red to violet pigments having tones desirable for image formation include azo pigments (with preferable examples including C.I. Pigment Red 3, 5, 11, 22, 38, 48:1, 48:2, 48:3, 48:4, 49:1, 52:1, 53:1, 57:1, 63:2, 144, 146 and 184, among which C.I. Pigment Red 57:1, 146 and 184 are particularly advantageous), quinacridone pigments (with preferable examples including C.I. Pigment Red 122, 192, 202, 207 and 209, and C.I. Pigment Violet 19 and 42, among which C.I. Pigment Red is particularly advantageous), triarylcarbonium pigments of lake pigment type (with preferable examples including the xanthene pigments of C.I. Pigment Red 81:1 and C.I. Pigment violet 1, 2, 3, 27 and 39), dioxazine pigments (e.g., C.I. Pigment Violet 23 and 37), diketopyrrolopyrrole pigments (e.g., C.I. Pigment Red 254), perylene pigments (e.g., C.I. Pigment Violet 29), anthraquinone dyes (e.g., C.I. Pigment Violet 5:1, 31 and 33), and thioindigo pigments (e.g., C.I. Pigment Red 38 and 88).

Suitable examples of yellow pigments having tones desirable for image formation include azo pigments (with preferable examples including the monoazo pigments of C.I. Pigment Yellow 1, 3, 74 and 98, the disazo pigments of C.I. Pigment Yellow 12, 13, 14, 16, 17 and 83, general azo pigments of C.I. Pigment Yellow 93, 94, 95, 128 and 155, and the benzimidazolone pigments of C.I. Pigment Yellow 120, 151, 154, 156 and 180, among which the pigments derived from benzidine compounds are particularly advantageous), isoindoline/isoindolinone pigments (with preferable examples including C.I. Pigment Yellow 109, 110, 137 and 139), quinophthalone pigment (including. C.I. Pigment Yellow 138 as a preferable example), and flavanthrone pigments (e.g., C.I. Pigment Yellow 24).

Suitable black pigments are inorganic pigments (including carbon black and magnetite as preferable examples) and aniline black.

In addition, orange pigments (e.g., C.I. Pigment Orange 13 and 16) and green pigments (e.g., C.I. Pigment Green 7) may be used.

The pigments used in the present ink may be bare pigments or surface-treated pigments. Methods thought to be usable for surface treatment of pigments include a method of coating the pigment surface with resin or wax, a method of causing surfactants to adhere to the pigment surface, and a method of binding a reactive substance (e.g., a silane coupling agent, and radicals produced from epoxy compounds, polyisocyanates and diazonium salts) to the pigment surface. These methods are written in the following literature and patents.

1) *Kinzoku Sekken no Seishitsu to Oyo* (SAIWAI SHOBO)
2) *Insatsu Ink Insatsu* (CMC Publishing Co., Ltd., 1984)
3) *Saishin Ganryo Oyo Gijutsu* (CMC Publishing Co., Ltd., 1986)
4) U.S. Pat. Nos. 5,554,739 and 5,571,311
5) JP-A-9-151342, JP-A-10-140065, JP-A-10-292143 and JP-A-11-166145.

The self-dispersible pigments prepared by reacting diazonium salts with carbon black as disclosed in the above U.S. Patents 4), and the encapsulated pigments prepared by the methods disclosed in the above Japanese Patents 5) are used to a particular advantage because high dispersion stability can be obtained without using any additional dispersant in ink.

In the present ink, pigments may be dispersed with the aid of dispersants. The dispersants can be chosen from various known ones, such as low molecular dispersants of surfactant type and polymeric dispersants, to suit the pigments used. Examples of such dispersants include those disclosed in JP-A-3-69949 and European Patent No. 549486. In the case of using dispersants, pigment derivatives referred to as synergists may further be added for the purpose of promoting adsorption of the dispersants to the pigments.

The grain sizes of pigments usable in the invention are preferably within the range of 0.01 to 10 μm, far preferably from 0.05 to 1 μm, after dispersion.

In dispersing pigments, known dispersing techniques used for production of ink and toner can be adopted. Examples of a dispersing machine usable therein include a vertical or horizontal agitator mill, an attrition mill, a colloid mill, a ball mill, a three-roll mill, a pearl mill, a super mill, an impeller, a disperser, a KD mill, a dynatron, and a pressure kneader. Details of the dispersing machines are described, e.g., in *Saishin Ganryo Oyo Gijutsu*, CMC Publishing Co., Ltd. (1986).

It is appropriate that the dye is used in ink in a proportion of 0.01 to 25% by weight, preferably 0.1 to 15% by weight, far preferably 0.5 to 10% by weight.

It is appropriate that water is used in ink in a proportion of 1 to 99% by weight, preferably 10 to 90% by weight, far preferably 20 to 80% by weight.

It is appropriate that the water-miscible organic solvent is used in ink in a proportion of 0.1 to 90% by weight, preferably 1 to 80% by weight, far preferably 5 to 60% by weight.

Surfactants usable in the present ink for inkjet recording are illustrated below.

When the present ink for inkjet recording contains a surfactant and thereby its liquid properties are adjusted, the consistency in jetting the ink is improved, the ink forms images improved in water resistance and an excellent effect is produced on prevention of ink bleed at the time of printing.

Examples of a surfactant usable in the present ink include anionic surfactants, such as sodium dodecylsulfate, sodium dodecyloxysulfonate and sodium alkylbenzenesulfonate; cationic surfactants, such as cetylpyridinium chloride, trimethylcetylammonium chloride and tetrabutylammonium chloride; and nonionic surfactants, such as polyoxyethylene nonyl phenyl ether, polyoxyethylene naphthyl ether and polyoxyethylene octyl phenyl ether. Of these surfactants, nonionic surfactants in particular are used to advantage.

The content of surfactants in the ink is from 0.001 to 20% by weight, preferably from 0.005 to 10% by weight, far preferably from 0.01 to 5% by weight.

The present ink for inkjet recording is ink containing at least a dye, water, a water-miscible organic solvent and a precursor of acids, and can be prepared by undergoing a process of dissolving or dispersing the dye into a water-based medium, preferably together with a surfactant. The term "a water-based medium" as used in the invention refers to water or a mixture of water and a water-miscible organic solvent to which additives, such as a humectant, a stabilizer and a preservative, are added as required.

When the present ink solution is aqueous ink, it is preferable that the first step in preparing the ink is to dissolve the dye in water. Then, various solvents and additives are added to the dye solution and undergo dissolving and mixing operations, thereby preparing a homogeneous ink solution.

For effecting the dissolution, various methods, such as dissolution by stirring, dissolution by exposure to ultrasonic waves and dissolution by shaking, can be adopted. Of these methods, stirring in particular is used to advantage. In carrying out stirring, various methods known in this field, such as flow stirring and shearing stress-utilized stirring for which a reversing agitator or a dissolver is used. On the other hand, a stirring method utilizing shearing stress against the base of a vessel as in the case of a magnetic stirrer can be used to advantage.

Examples of a water-miscible organic solvent usable in the invention include alcohol (e.g., methanol, ethanol, propanol, isopropanol, butanol, isobutanol, sec-butanol, t-butanol, pentanol, hexanol, cyclohexanol, benzyl alcohol), polyhydric alcohol (e.g., ethylene glycol, diethylene glycol, triethylene glycol, polyethylene glycol, propylene glycol, dipropylene glycol, polypropylene glycol, butylene glycol, hexanediol, pentanediol, glycerine, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine), and other polar solvents (e.g., formamide, N,N-dimethylformamide, N,N-dimethylacetamide, dimethyl sulfoxide, sulforane, 2-pyrrolidone, N-methyl-2-pyrrolidone, N-vinyl-2-pyrrolidone, 2-oxazolidone, 1,3-dimethyl-2-imidazolidinone, acetonitrile, acetone). Additionally, these water-miscible organic solvents may be used as combinations of two or more thereof.

In the case where the dyes contained in the present ink are oil-soluble dyes, the present ink is prepared by undergoing processes of dissolving the oil-soluble dyes in a high boiling organic solvent and dispersing the dissolved dyes in the form of emulsion in a water-based medium.

The high boiling organic solvent usable in the invention is an organic solvent having a boiling point of 150° C. or higher, preferably 170° C. or higher.

Examples of such an organic solvent include phthalic acid esters (such as dibutyl phthalate, dioctyl phthalate, dicyclohexyl phthalate, di-2-ethylhexyl phthalate, decyl phthalate, bis(2,4-di-tert-amylphenyl) isophthalate and bis(1,1-diethylpropyl)phthalate), phosphoric or phosphonic acid esters (such as diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate and di-2-ethylhexxylphenyl phosphate), benzoic acid esters (such as 2-ethylhexylbenzoate, 2,4-dichlorobenzoate, dodecylbenzoate and 2-ethylhexyl-p-hydroxybenzoate), amides (such as N,N-diethyldodecanamide and N,N-diethyllaurylamide), alcohol compounds (such as isostearyl alcohol), aliphatic esters (such as dibutoxyethyl succinate, di-2-ethylhexyl succinate, 2-hexyldecyl tetradecanoate, tributyl citrate, diethyl azelate, isostearyl lactate and trioctyl citrate), aniline derivatives (such as N,N-dibutyl-2-butoxy-5-tert-octylaniline), chlorinated paraffin (such as paraffin having a chlorine content of 10 to 80%), trimesic acid esters (such as tributyl trimesate), dodecylbenzene, diisopropylnaphthalene, phenols (such as 2,4-di-tert-anylphenol, 4-dodecyloxyphenol, 4-dodecyloxycarbonylphenol and 4-(4-dodecyloxyphenylsulfonyl)phenol), carboxylic acids (such as 2-(2,4-di-tert-amulphenoxy-butyric acid and 2-ethoxyoctanedecanoic acid), and alkylphosphoric acids (such as di-2-(ethylhexyl)phosphoric acid and diphenylphosphoric acid). The ratio of the amount of a high boiling organic solvent used to the amount of oil-soluble dyes dissolved therein is from 0.01 to 3, preferably from 0.01 to 1.0, by weight.

Those high boiling organic solvents may be used alone or as a mixture of two or more thereof (e.g., a mixture of tricresyl phosphate and dibutyl phthalate, a mixture of trioctyl phosphate and di(2-ethylhexyl)sebacate, a mixture of dibutyl phthalate and poly(N-t-butylacrylamide).

Examples of high boiling organic solvents usable in the invention, other than the above-recited ones, and/or synthetic methods of these high boiling organic solvents are disclosed, e.g., in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276319, EP-A-286253. EP-A-289820, EP-A-309158, EP-A-309159, EP-A-309160, EP-A-509311 and EP-A-510576, East German Patent Nos. 147,009, 157,147, 159,573 and 225,240A, GB-A-2091124, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-23541, JP-A-4-29237, JP-A-4-30165, JP-A-4-232946 and JP-A-4-346338.

The above high boiling organic solvents are used in a proportion of 0.01 to 3.0 parts by weight, preferably 0.01 to 1.0 parts by weight, to 1 parts by weight of oil-soluble dyes.

In the invention, oil-soluble dyes and high boiling organic solvents are used in a state that they are emulsified and dispersed in a water-based medium. In emulsifying and dispersing operations, low boiling organic solvents can be used from the viewpoint of emulsifying capability. Herein, organic solvents having their boiling points in the range of about 30° C. to about 150° C. under normal atmospheric pressure are defined as low boiling organic solvents. Suitable examples of such solvents include esters (e.g., ethyl acetate, butyl acetate, ethyl propionate, β-ethoxyethyl acetate, methyl cellosolve acetate), alcohol compounds (e.g., isopropyl alcohol, n-butyl alcohol, sec-butyl alcohol), ketones (e.g., methyl isobutyl ketone, methyl ethyl ketone, cyclohexanone), amides (e.g., dimethylformamide, N-methylpyrrolidone) and ethers (e.g., tetrahydrofuran, dioxane). However, low boiling organic solvents usable in the invention should not be construed as being limited to those examples.

Emulsification in the process of dispersion is carried out in order to form into fine droplets an oil phase of dyes dissolved in a high boiling organic solvent or, in some cases, a mixture of high boiling and low boiling organic solvents when dispersing the oil phase into a water phase made up mainly of water. Herein, additives as described hereinafter, e.g., surfactants, humectants, dye stabilizers, emulsion stabilizers, antiseptics and fungicides, can be added to either the water phase or the oil phase, or both these phases on an as needed basis.

The method generally used for emulsification is a method of adding an oil phase to a water phase. Alternatively, a method of dripping a water phase into an oil phase, or the so-called phase inversion emulsification, is also used suitably. Incidentally, the emulsification methods are also applicable to the cases where the additives used in the invention are oil-soluble substances although the dyes used are soluble in water.

In preparing a dispersion in an emulsified state, various kinds of surfactants can be used. Examples of surfactants suitable for emulsification include anionic surfactants, such as alkylsulfates, alkylbenzenesulfonates, alkylnaphthalenesulfonates, dialkylsulfosuccinates, alkylphosphates, naphthalenesulfonic acid-formaldehyde condensates and polyoxyethylene alkylsulfates; and nonionic surfactants, such as polyoxyethylene alkyl ethers, polyoxyethylene alkyl aryl ethers, polyoxyethylene fatty acid esters, sorbitan fatty acid esters, polyoxyethylene sorbitan fatty acid esters, polyoxyethylene alkylamines, glycerin fatty acid esters and oxyethylene-oxypropylene block copolymers. In addition, the acetylene series polyoxyethylene oxide surfactants of SURFYNOLS (produced by Air Products and Chemicals Inc.) are also suitable. Further, amine oxide type of amphoteric surfactants, such as N,N-dimethyl-N-alkylamine oxides, are usable as well. Furthermore, the surfactants disclosed in JP-A-59-157636, pp. 37–38, and *Research Disclosure*, No. 308119 (1989), can be used.

For the purpose of aiming at stabilization of emulsions just after preparation, water-soluble polymers can be added in combination with the surfactants as recited above. Examples of water-soluble polymers suitable for such a purpose include polyvinyl alcohol, polyvinyl pyrrolidone, polyethylene oxide, polyacrylic acid, polyacrylamide, and copolymers prepared from two or more of monomers constituting the homopolymers recited above. In addition, natural water-soluble polymers, such as polysaccharide, casein and gelatin, can also be used suitably. For further stabilization of dye dispersions, polymers substantially insoluble in water-based media can also be added. Examples of such polymers include vinyl polymers prepared by polymerizing acrylic acid esters, methacrylic acid esters, vinyl esters, acrylamides, methacrylamides, olefins, styrene compounds, vinyl ethers or/and acrylonitriles, polyurethane, polyester, polyamide, polyurea and polycarbonate. For the above purpose, it is preferable that those polymers contain —$SO_3^-$ or —$COO^-$ group. It is appropriate that these polymers having substantially no solubility in water-based media be used in a proportion of at most 20 weight %, preferably at most 10 weight %, to high boiling organic solvents used together therewith.

In preparing water-based ink by dispersing oil-soluble dyes and high boiling organic solvents in an emulsified state, the particle size control is especially important. For enhancement of color purity and density of images formed by inkjet recording, it is required to reduce an average size of particles in the water-based ink. The volume average size of the particles is preferably 1 μm or below, far preferably from 5 to 100 nm.

The volume average size and the size distribution of the dispersed particles can be easily determined by known methods including a static light-scattering method, a dynamic light-scattering method, a centrifugal sedimentation method and the methods described in *Jikken Kagaku Koza,* 4th ed., pp. 417–418. For instance, the volume-average size of particles in ink is easily determined by diluting the ink with distilled water so as to adjust the particle concentration to 0.1–1% by weight, and measuring a volume-average particle size of the ink with a commercially available particle analyzer (e.g., Microtrac UPA, made by Nikkiso Co., Ltd.). In addition, the dynamic light-scattering method utilizing laser Doppler effect is used to particular advantage because its capability of particle size measurement down to fine sizes.

The term "volume average particle size" refers to the average particle size determined by assigning a weight depending on a volume of each particle to its size, or the value obtained by dividing the sum total of products of diameters and volumes of individual particles in a set of particles by the total volume of the particles. The description of the volume average particle size can be found, e.g., in Soichi Muroi, *Kobunshi Latex no Kagaku*, p. 119, Kobunshi Kanko-Kai.

Further, it has been found out that the presence of coarse particles also plays an important role in the printability. In other words, the coarse particles clog nozzles of a printing head, or form dregs even if clogging of the nozzles is not yet caused; as a result, it becomes impossible to jet the ink, or a kink is formed in the jet of ink to exert a serious influence on printability. For prevention of such a problem, it is significant to control the number of particles not smaller than 5 μm to at most 10 and the number of particles not smaller than 1 μm to at most 1,000 per μl of the ink prepared.

As a method for eliminating such coarse particles, a known centrifugal separation method or precision filtering method can be adopted. Such a separating operation may be performed just after dispersion in an emulsified state or during a period between the end of addition of various additives, such as humectants and surfactants, to the emulsion dispersion and the instant preceding the charge of ink into an ink cartridge.

As an effective measure to reduce the average size of particles and eliminate coarse particles, a mechanically emulsifying apparatus can be adopted.

Examples of an emulsifying apparatus which can be used herein include known apparatus of various types, such as a simple stirrer type, an impeller stirrer type, an in-line stirrer type, a mill type such as a colloid mill, and an ultrasonic wave type. However, it is preferable to use a high-pressure homogenizer in particular.

The detailed mechanisms of high-pressure homogenizers are disclosed, e.g., in U.S. Pat. No. 4,533,254 and JP-A-6-47264. The high-pressure homogenizers available commercially are Gaulin Homogenizer (made by A.P.V GAULIN INC.), Microfluidizer (made by MICROFLUIDEX INC.) and Multimizer (made by SUGINO MACHINE LIMITED).

The latest model of high-pressure homogenizer as disclosed in U.S. Pat. No. 5,720,551, which is equipped with a mechanism to form fine particles in an ultrahigh-pressure jet stream, is particularly effective in preparing the present emulsion dispersion. An example of such an ultrahigh-pressure jet stream-utilized emulsifying apparatus is DeBEE 2000 (made by BEE INTERNATIONAL LTD.).

The pressure at the time of emulsification with a high-pressure emulsifying and dispersing apparatus is at least 50 MPa, preferably at least 60 MPa, and far preferably at least 180 MPa.

A method of using at least two types of emulsifying apparatus in combination, e.g., a method of using a stirrer-type emulsifying apparatus first and then passing through a high-pressure homogenizer, is especially preferable. Another method used to advantage is a method of once performing an emulsifying and dispersing operation with the combination of different types of emulsifying apparatus, then adding additives such as a humectant and a surfactant, and passing again through a high-pressure homogenizer before the ink is charged into a cartridge.

When not only a high boiling organic solvent but also a low boiling organic solvent is utilized in the emulsion making, it is appropriate to remove the low boiling organic solvent from the emulsion made in terms of emulsion stability and for reasons of safety and hygiene. The method of removing a low boiling organic solvent can be chosen from known methods depending on the kind thereof. More specifically, evaporation, vacuum evaporation and ultrafiltration methods are applicable to the removal. It is preferable that such a removal operation is performed at the earliest possible stage after emulsification.

Methods of preparing ink for inkjet recording are described in detail, e.g., in JP-A-5-148436, JP-A-5-295312, JP-A-7-97541, JP-A-7-82515 and JP-A-7-118584, and these methods are also applicable to preparation of the present ink for inkjet recording.

In the present ink for inkjet recording, additives selected properly from a wide variety of known ones can be mixed in respectively appropriate amounts. Examples of known additives include an anti-drying agent for preventing inkjet nozzles from being clogged due to drying, a penetration accelerator for enabling better penetration of ink into paper, an ultraviolet absorbent, an antioxidant, a viscosity modifier, a surface tension modifier, a dispersant, a dispersion stabilizer, a fungicide, a corrosion inhibitor, a pH modifier, an antifoam agent and a chelating agent.

The anti-drying agent usable in the invention is a water-miscible organic solvent lower in vapor pressure than water.

Examples of such a solvent include polyhydric alcohol compounds represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin and trimethylolpropane; lower alkyl ethers of polyhydric alcohol compounds, such as ethylene glycol monomethyl (or monoethyl) ether, diethylene glycol monomethyl (or monoethyl) ether and triethylene glycol monomethyl (monoethyl) ether; heterocyclic compounds, such as 2-pyrrolidone, N-methyl-2-pyrrolidone, 1,3-dimethyl-2-imidazolidine and N-ethylmorpholine; sulfur-containing compounds, such as sulfolane, dimethylsulfoxide and 3-sulfolene; polyfunctional compounds, such as diacetone alcohol and diethanolamine; and urea derivatives. These anti-drying agents can be used alone or as combination of two or more thereof. The suitable proportion of these anti-drying agents in the present ink is from 10 to 50% by weight.

Examples of a penetration accelerator usable in the invention include alcohol compounds, such as ethanol, isopropanol, butanol, di(tri)ethylene glycol monobutyl ether and 1,2-hexanediol, sodium laurylsulfate, sodium oleate, and nonionic surfactants. When such a penetration accelerator is contained in the ink in a proportion of 10 to 30% by weight, it can produce sufficient effect. It is preferable to add the penetration accelerator in an amount not to cause ink bleed and print through.

Examples of an ultraviolet absorbent usable for improving the keeping quality of the images printed in the present ink include the benzotriazole compounds as disclosed in JP-A-58-185677, JP-A-61-190537, JP-A-2-782, JP-A-5-197075 and JP-A-9-34057, the benzophenone compounds as disclosed in JP-A-46-2784, JP-A-5-194483 and U.S. Pat. No. 3,214,463, the cinnamic acid compounds as disclosed in JP-B-48-30492, JP-B-56-21141 and JP-A-10-88106, the triazine compounds as disclosed in JP-A-4-298503, JP-A-8-53427, JP-A-8-239368, JP-A-10-182621 and JP-T-8-501291 (the term "JP-T" as used herein means a published Japanese translation of a PCT patent application), the compounds disclosed in *Research Disclosure*, No. 24239, and the compounds showing fluorescence by absorbing ultraviolet rays, or the so-called fluorescent whitening agents, represented by stilbene compounds and benzoxazole compounds.

As the antioxidants for improving the keeping quality of images printed in the present ink, various fading inhibitors of organic compound type and metal complex type can be used. Examples of a fading inhibitor of organic compound type include hydroquinones, alkoxyphenols, dialkoxyphenols, phenols, anilines, amine, indanes, chromans, alkoxyanilines, and heterocyclic compounds. Examples of a fading inhibitor of metal complex type include nickel complexes and zinc complexes. More specifically, the compounds usable as fading inhibitor are the compounds disclosed in *Research Disclosure*, No. 17643, Items VII-I to VII-J, No. 15162, No. 18716, p. 650, left column, No. 36544, p. 527, No. 307105, p. 872, the compounds disclosed in the patents cited in *Research Disclosure*, No. 15162, and the compounds included in the general formulae and the examples of the representative compounds disclosed in JP-A-62-215272, pp. 127–137.

Examples of a fungicide usable in the invention include sodium dehydroacetate, sodium benzoate, sodium pyridinethione-1-oxide, ethyl p-hydroxybenzoate, 1,2-benzoisothiazoline-3-one and its salts. The suitable proportion of these compounds in the ink is from 0.02 to 5.00% by weight.

For details of such fungicides *Bokin•Bobaizai Jiten* (compiled by Nippon Bokin Bobai Gakkai Jiten Henshu Iinkai) can be referred to.

Examples of a corrosion inhibitor usable in the invention include acidic sulfite, sodium thiosulfate, ammonium thioglycolate, diisopropylammonium nitrite, pentaerythritol tetranitrate, dicyclohexyl ammonium nitrite and benzotriazole. The suitable proportion of these compounds in the ink is from 0.02 to 5.00% by weight.

The use of a pH modifier in the present ink is favorable for controlling pH and providing dispersion stability, and thereby the ink is preferably adjusted to pH 8–11 at 25° C. When the pH of the ink is lower than 8, the solubility of dyes in the ink is lowered and the ink tends to clog nozzles; while, when the pH of the ink is higher than 11, the ink develops a tendency to suffer deterioration in water resistance. As basic pH modifiers, organic bases and inorganic alkalis are usable, and organic acids and inorganic acids are usable as acidic pH modifiers.

Examples of a basic compound usable as the pH modifier include inorganic compounds, such as sodium hydroxide, sodium carbonate, potassium carbonate, sodium hydrogen carbonate, potassium hydrogen carbonate, sodium acetate, potassium acetate, sodium phosphate and sodium monohydrogen phosphate; and organic bases, such as aqueous ammonia, methylamine, ethylamine, diethylamine, triethylamine, ethanolamine, diethanolamine, triethanolamine, ethylenediamine, piperidine, diazabicyclooctane, diazabicycloundecene, pyridine, quinoline, picoline, lutidine and collidine.

Examples of an acidic compound usable as the pH modifier include inorganic compounds, such as hydrochloric acid, sulfuric acid, phosphoric acid, boric acid, sodium hydrogen sulfate, potassium hydrogen sulfate, potassium dihydrogen phosphate and sodium dihydrogen phosphate; and organic compounds, such as acetic acid, tartaric acid, benzoic acid, trifluoroacetaic acid, methanesulfonic acid, ethanesulfonic acid, benzenesulfonic acid, p-toluenesulfonic acid, saccharic acid, phthalic acid, picolinic acid and quinolinic acid.

The present ink has its conductivity within the range of 0.01 to 10 S/m. And the range of 0.05 to 5 S/m in particular is suitable as the conductivity of the present ink.

The conductivity can be determined in accordance with an electrode method of using commercially available saturated potassium chloride.

The conductivity can be controlled mainly by an ion concentration in the aqueous solution. When a salt concentration is high, the salts can be removed with an ultrafilter membrane. When the conductivity is controlled by addition of salts, on the other hand, various kinds of organic and inorganic salts can be used.

Examples of an inorganic salts usable therein include potassium halides, sodium halides, sodium sulfate, potassium sulfate, sodium hydrogen sulfate, potassium hydrogen sulfate, sodium nitrate, potassium nitrate, sodium hydrogen carbonate, potassium hydrogen carbonate, sodium phosphate, sodium monohydrogen phosphate, boric acid, potassium dihydrogen phosphate and sodium dihydrogen phosphate, and examples of an organic salt usable therein include sodium acetate, potassium acetate, potassium tartarate, sodium tartarate, sodium benzoate, potassium benzoate, sodium p-toluenesulfonate, potassium saccharate, potassium phthalate and sodium picolinate.

Further, the conductivity can also be adjusted by selecting ingredients of the aqueous medium mentioned hereinafter.

The suitable viscosity of the present ink is from 1 to 20 mPa, preferably from 2 to 15 mPa, particularly preferably from 2 to 10 mPa, at 25° C. When the viscosity of ink is higher than 30 mPa, the fixation of images recorded in the ink is slowed down and jetting capability of the ink is lowered. When the viscosity is lower than 1 mPa, on the other hand, the images recorded become blurred and their definition is lowered.

The viscosity can be controlled freely by the amount of an ink solvent added. Examples of an ink solvent suitable for viscosity control include glycerin, diethylene glycol, triethanolamine, 2-pyrrolidone, diethylene glycol monobutyl ether, and triethylene glycol monobutyl ether.

Alternatively, a viscosity modifier may be used for the viscosity control. Examples of a viscosity modifier usable herein include cellulose, water-soluble polymers such as polyvinyl alcohol, and nonionic surfactants. For details of viscosity modifiers *Nendo Chosei Gijutsu*, chap. 9, Gijutsu Joho Kyokai (1999) and *Inkjet Printer yo Chemicals (98 Zoho)—Zairyo no Kaihatsu Doko•Tenbo Chosa—*, pp. 162–174, CMC Publishing Co., Ltd. (1997) can be referred to.

Methods for measuring viscosity of liquid are described in detail in JIS Z8803, and the viscosity of liquid can be determined easily with a commercially available viscometer. For instance, rotational viscometers, such as B-type viscometer and E-type viscometer made by Tokyo Keiki Kogyo, can be used. The viscosity measurement in the invention is carried out at 25° C. by use of a vibrational viscometer, Model VM-100A-L made by YAMAICHI ELECTRONICS Co., Ltd. The unit of viscosity is Pa·s, but mPa·s is in common use.

As to the surface tension of the present ink, it is appropriate that both static and dynamic surface tensions be within the range of 20 to 50 mN/m, preferably 20 to 40 mN/m. When the surface tensions exceed 50 mN/m, the consistency in jetting the ink is lowered and the quality of images printed in the ink deteriorate because bleeding and feathering are caused in mixed color areas. When the surface tensions are not higher than 20 mN/m, ink adhesion to the hardware surface occurs when the ink is jetted and sometimes impairs the print quality.

For the purpose of surface tension control also, various types of surfactants including the cationic, anionic and nonionic surfactants as recited above can be added. The suitable proportion of surfactants in the present ink for inkjet recording is from 0.01 to 20% by weight, preferably from 0.1 to 10% by weight. Additionally, those surfactants may be used as combinations of two or more thereof.

To measurement of static surface tension, a capillary rise method, a falling-drop method and a hanging ring method are known to be applicable. However, a vertical plate method is adopted as the static surface tension measurement in the invention. When hanging a thin plate of glass or platinum in a vertical direction so as to immerse a part of the thin plate into a liquid, the surface tension of the liquid acts downward along the length of the contact between the liquid and the thin plate. The surface tension can be determined by balancing this downward force with an upward force.

To measurement of dynamic surface tension, on the other hand, a vibrating jet method, a meniscus dropping method and a maximum bubble pressure method are known to be applicable, as described in *Shin Jikken Kagaku Koza*, vol. 18 (Kaimen to Colloid), pp. 69–90, Maruzen Co., Ltd. (1977). In addition, the liquid membrane break method as disclosed in JP-A-3-2064 is also known to be applicable. However, the measurement of dynamic surface tension in the invention is carried out using a bubble pressure differential method. The principle of this method and the way to measure are explained below.

Air bubbles are generated in a solution rendered homogeneous by stirring, and thereby a new air-liquid interface is formed and surfactant molecules in the solution are gathered on the water surface at a constant rate. When the bubble rate (the bubble generation rate) is made slower in making changes thereto, a greater number of surfactant molecules can gather on the bubble surface, and the maximum bubble pressure right before bubbles burst can be lowered. As a result, the maximum bubble pressure (surface tension) relative to the bubble rate can be detected. For determination of dynamic surface tension can be suitably utilized a method of generating air bubbles in a solution by use of two probes large and small, measuring a pressure difference between the two probes under the maximum bubble pressure conditions, and therefrom calculating the dynamic surface tension.

In the present ink, it is advantageous for nonvolatile components to make up 10 to 70 weight % of the total components from the viewpoints of consistency in jetting the ink, print quality, various kinds of fastness of images printed in the ink, and reduction in image blur after printing and stickiness of ink-printed areas. And, from the viewpoints of consistency in jetting the ink and reduction in image blur after printing, it is more advantageous that the content of nonvolatile components in the present ink is from 20 to 60 weight %.

The term "nonvolatile components" as used herein is intended to include liquid, solid and high molecular weight components having boiling points not lower than 150° C. at one atmospheric pressure. More specifically, the nonvolatile components in the ink for inkjet recording include dyes, high boiling solvents, and additives added as needed, such as polymer latices, surfactants, dye stabilizers, fungicides and buffers. Most of these nonvolatile components, other than dye stabilizers, have disadvantages of lowering the dispersion stability of the ink, and inhibiting the stabilization of dyes by association on image-receiving paper and exacerbating various kinds of fastness of printed image areas and image blur under high humidity conditions.

In the present ink, it is possible to contain high molecular weight compounds. The term "high molecular weight compounds" as used herein is intended to include all of high molecular compounds having number average molecular weights of at least 5,000 as far as they can be incorporated in ink. Examples of such high molecular compounds include a water-soluble high molecular compound, a water-dispersible high molecular compound such as polymer latex and polymer emulsion, and an alcohol-soluble high molecular compound having solubility in polyhydric alcohol compounds used as auxiliary solvents. Other high molecular compounds may also be included in the present high molecular weight compounds as far as they can be dissolved or dispersed homogeneously in a substantial sense into the ink solution.

Examples of a water-soluble high molecular compound usable in the present ink include water-soluble polymers, such as polyvinyl alcohol, silanol-modified polyvinyl alcohol, carboxymethyl cellulose, hydroxyethyl cellulsode, polyvinyl pyrrolidone, polyalkylene oxides including polyethylene oxide and polypropylene oxide, and polyalkylene oxide derivatives; natural water-soluble high polymers, such as polysaccharide, starch, cationic starch, casein and gelatin; water-soluble acrylic resins, such as polyacrylic acid, polyacrylamide and acrylic acid-acrylamide copolymer; water-soluble alkyd resins; and water-soluble high molecular compounds containing —SO$_3^-$ or —COO$^-$ groups and having substantial solubility in a water-based medium.

Examples of polymer latex usable in the present ink include styrene-butadiene latex, styrene-acrylic latex and polyurethane latex. And one example of polymer emulsions usable in the present ink is an acrylic emulsion.

Those water-soluble high molecular compounds can be used alone or as combinations of two or more thereof.

The water-soluble high molecular compounds, as mentioned above, are used as a viscosity modifier for adjusting the ink viscosity to the range favorable for jetting properties. When high molecular compounds are added in a large amount, the ink viscosity increased thereby causes a lowering of consistency in jetting the ink, and they are deposited with a lapse of time and tend to clog nozzles.

The amount of a high molecular compound added as viscosity modifier depends on the molecular weight of the compound added (namely the higher the molecular weight of the compound added, the smaller amount of addition suffices for modification of viscosity). Specifically, the amount added is controlled to the range of 0 to 5%, preferably 0 to 3%, far preferably 0 to 1%, of the total weight of the ink.

In the invention, nonionic, cationic or anionic surfactants can be added as a surface tension modifier separately from the purpose the surfactants recited above are used for. Examples of an anionic surfactant usable as surface tension modifier include fatty acid salts, alkylsulfates, alkylbenzenesulfonates, alkylnaphthalenesulfonates, dialkylsulfosuccinates, alkylphosphates, naphthalenesulfonic acid-formaldehyde condensates and polyoxyethylene alkylsulfates. Examples of a nonionic surfactant usable as the foregoing modifier include polyoxyethylene alkyl ethers, polyoxyethylene alkyl aryl ethers, polyoxyethylene fatty acid esters, sorbitan fatty acid esters, polyoxyethylene sorbitan fatty acid esters, polyoxyethylene alkylamines, glycerin fatty acid esters and oxyethylene-oxypropylene block copolymers. In addition, the acetylene series polyoxyethylene oxide surfactants of SURFYNOLS (produced by Air Products and Chemicals Inc.) are also suitable. Further, amine oxide type of amphoteric surfactants, such as N,N-dimethyl-N-alkylamine oxides, are usable as well. Furthermore, the surfactants disclosed in JP-A-59-157636, pp. 37–38, and *Research Disclosure*, No. 308119 (1989), can be used.

In the invention, if needed, the various cationic, anionic and nonionic surfactants as recited above can also be used as dispersants and dispersion stabilizers, and fluorine-containing compounds and silicone compounds as antifoam agents and chelating agents represented by EDTA can be used as well.

Next the present ink set is described below.

The present ink set has at least two ink solutions different in color. For achieving full-color printing in particular, it is appropriate that the ink set have ink solutions of at least three primary colors in the subtractive process. In order to improve the quality of character images, it is more appropriate that the ink set further have black ink.

To further improvements in tone reproducibility and graininess of color images, it is especially advantageous for not only cyan ink but also color ink with a hue other than cyan to be a combined use of at least two ink solutions of light and dark colors. In the case where yellow ink is included in the ink set, dark yellow ink mixed with a small amount of cyan or black ink can also be used to advantage.

Such an ink set is preferably used in a cartridge form. For instance, it is possible to use a set of a black ink cartridge and a color ink cartridge, or a set of cartridges in which all the ink solutions of different colors are contained individually.

Recording papers and recording films usable in the invention are described below.

An example of the support of a recording paper or a recording film is paper manufactured from chemical pulp such as LBKP or NBKP, mechanical pulp such as GP, PGW, RMP, TMP, CTMP, CMP or CGP, or waste paper such as DIP, wherein known additives including a dye, a binder, a sizing agent, a fixing agent, a cationic agent and a paper strength increasing agent are mixed as needed, by use of a paper machine such as a Fourdrinier machine or a vat machine. And other examples of the support are synthetic paper and plastic film sheets. The suitable thickness of the support is from 10 to 250 µm, and the suitable basis weight of the support is from 10 to 250 g/m$^2$.

A material for receiving the present ink images may be made by providing an image-receiving layer and a backing coat layer directly on the support, or by subjecting the support to sizing with starch or polyvinyl alcohol or to anchoring, and then by providing an image-receiving layer and a backing coat layer on the sized or anchored support. Further, the support may be subjected to flattening processing with a calendering apparatus, such as a machine calender, a TG calender or a soft calender.

The support far preferred in the invention is paper laminated with polyolefin (e.g., polyethylene, polypropylene and ethylene-propylene copolymer) or polyethylene terephthalate on both sides, or plastic film. To the polyolefin, a white pigment (e.g., titanium dioxide, zinc oxide) or a tinting dye (e.g., cobalt blue, ultramarine blue, neodymium oxide) is preferably added.

In an image-receiving layer provided on the support, a porous material and an aqueous binder are incorporated. Further, a pigment is preferably contained therein, and a white pigment is suitable as the pigment. Examples of a white pigment include inorganic pigments, such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate; and organic pigments, such as styrene pigment, acrylic pigment, urethane resin and melamine resin. Of these pigments, porous white inorganic pigments are preferred over the others. And synthetic amorphous silica having a great pore area is used to particular advantage. As the synthetic amorphous silica, both silicic acid anhydride synthesized in dry process (vapor-phase process) and hydrated silicic acid synthesized in a wet process are usable.

Examples of a recording paper containing the foregoing pigments in its image-receiving layer which can be used in the invention include those disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777 and JP-A-2001-301314.

Examples of an aqueous binder contained in the image-receiving layer include water-soluble polymers, such as polyvinyl alcohol, silanol-modified polyvinyl alcohol, starch, cationic starch, casein, gelatin, carboxymethyl cellulose, hydroxyethyl cellulsode, polyvinyl pyrrolidone, polyalkylene oxides and polyalkylene oxide derivatives; and water-dispersible polymers, such as styrene-butadiene latex and an acrylic emulsion. These aqueous binders can be used alone or as combinations of two or more thereof. Of those aqueous binders, polyvinyl alcohol and silanol-modified polyvinyl alcohol are especially favorable from the viewpoints of adhesion to pigments and delamination resistance of the ink-receiving layer.

In addition to pigments and aqueous binders, the image-receiving layer can further contain other additives, such as a mordant, a waterproofing agent, a light resistance improver, a gas resistance improver, a surfactant and a hardener.

To the image-receiving layer, an immobilized mordant is preferably added. Therefore, it is appropriate to use a polymeric mordant.

Descriptions of polymeric mordants can be found in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305 and 4,450,224. The image-receiving materials containing the polymeric mordants disclosed in JP-A-1-161236, pp. 212–215, are especially favorable. When the polymeric mordants disclosed in this reference are used, the images obtained can have excellent image quality and improved light resistance.

Waterproofing agents are effective in rendering images waterproof. As these agents, cationic resins are especially preferred. Examples of such cationic resins include polyamidepolyamine epichlorohydrin, polyethyleneimine, polyaminesulfone, dimethyldiallylammonium chloride polymer, and cationic polyacrylamide. These cationic resins are preferably contained in a proportion of 1 to 15% by weight, particularly 3 to 10% by weight, to the total solids in the ink-receiving layer.

Compounds usable as a light resistance improver and a gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharide, water-soluble reducing compounds, organic acids, inorganic acid, hydroxyl group-containing organic acids, benzotriazole compounds, benzophenone compounds, triazine compounds, heterocyclic compounds, water-soluble metal salts, organometallic compounds and metal complexes.

Examples of these compounds include the compounds disclosed in JP-A-10-182621, JP-A-2001-260519, JP-A-2000-260519, JP-B-4-34953, JP-B-4-34513, JP-B-34512, JP-A-11-170686, JP-A-60-67190, JP-A-7-276808, JP-A-2000-94829, JP-T-8-512258, and JP-A-11-321090.

Surfactants function as a coating aid, a stripping quality modifier, a slipping quality modifier or an antistatic agent. Examples of surfactants functioning as such agents include those disclosed in JP-A-62-173463 and JP-A-62-183457.

Instead of surfactants, fluorinated organic compounds may be used. It is preferable for the fluorinated organic compounds to be hydrophobic. Examples of such compounds include fluorine-containing surfactants, oily fluorine compounds (e.g., fluorinated oil), and solid fluorinated synthetic resins (e.g., tetrafluoroethylene resin). For details of fluorinated organic compounds JP-B-57-9053, columns 8–17, JP-A-61-20994 and JP-A-62-135826 can be referred to.

Examples of a hardener usable in the invention include the materials disclosed in JP-A-1-161236, p. 222, JP-A-9-263036, JP-A-10-119423 and JP-A-2001-310547.

Examples of other additives which can further be added to the image-receiving layer include a pigment-dispersing agent, a thickening agent, an antifoam agent, a dye, a brightening agent, an antiseptic, a pH adjusting agent and a matting agent. Additionally, the ink-receiving layer may be a single layer or a double layer.

The recording paper and the recording film may be provided with a backcoating layer. To this layer, a white pigment, an aqueous binder and other ingredients can be added.

Examples of a white pigment containable in the backcoating layer include white inorganic pigments, such as precipitated calcium carbonate, ground calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrohalloysite, magnesium carbonate and magnesium hydroxide; and organic pigments, such as styrene plastic pigments, acrylic plastic pigments, polyethylene, microcapsules, urea resin and melamine resin.

Examples of an aqueous binder containable in the backcoating layer include water-soluble polymers, such as styrene-maleate copolymer, styrene-acrylate copolymer, polyvinyl alcohol, silanol-modified polyvinyl alcohol, starch, cationic starch, casein, gelatin, carboxymethyl cellulose, hydroxyethyl cellulose and polyvinyl pyrrolidone; and water-dispersible poymers, such as styrene-butadiene latex and an acrylic emulsion. Examples of other ingredients containable in the backcoating layer include an antifoam agent, a foam depresser, a dye, a brightening agent, an antiseptic and a waterproofing agent.

To constituent layers (including a backing layer) of the inkjet recording paper or recording film, a dispersion of polymer particulates may be added. The dispersion of polymer particulates is used for the purpose of improving physical properties of coating layers, e.g., ensuring dimensional stability in the coating layers and preventing the coating layers from curling, sticking and cracking. Descriptions of the dispersion of polymer particulates can be found in JP-A-62-245258, JP-A-62-136648 and JP-A-62-110066. When the dispersion of polymer particulates having a low glass transition temperature (40° C. or below) is added to a mordant-containing layer, the layer can be prevented from cracking and curling. And the curling of recording paper or film can also be prevented by adding to a backing layer the dispersion of polymer particulates having a high glass transition temperature.

The present ink for inkjet recording can be used for purposes other than inkjet recording. For instance, the present ink is usable as a display-image material, and a material for forming images on interior decoration materials and exterior decoration materials.

Examples of a display image material include images painted on or attached to poster, wallpaper, decorative articles (e.g., ornaments and dolls), advertising fliers, wrapping paper and materials, paper bags, plastic bags, package materials, billboards and sides of transport facilities (cars, buses and trains), and logos on clothes. When the present dye ink is used as a material for forming display images, the term "images" as used herein is intended to include all of recognizable patterns formed in the dye ink, from images in a narrow sense to abstract designs, characters and geometrical patterns.

Examples of interior decoration materials include a wide variety of materials such as wallpaper, decorative articles (e.g., ornaments and dolls), members of lighting fixtures, members of furniture, design members of floor and ceiling. When the present dye ink is used as the material for forming images on such materials, the term "images" as used herein is intended to include all of recognizable patterns formed in the dye ink, from images in a narrow sense to abstract designs, characters and geometrical patterns.

Examples of exterior decoration materials include a wide variety of materials such as wall materials, outdoor decorative articles for gardening (e.g., ornaments and dolls), and members of outdoor lighting fixtures. When the present dye ink is used as the material for forming images on such materials, the term "images" as used herein is intended to include all of recognizable patterns formed in the dye ink, from images in a narrow sense to abstract designs, characters and geometrical patterns.

Examples of media on which patterns are formed in the foregoing uses include paper, texture, cloth (including non-woven fabric), plastics, metals and ceramics. The dyeing can be effected in a mode of mordanting, textile printing or dye fixation using a reactive group-introduced dye. Of these modes, the dyeing in the mode of mordanting is preferred over the others.

In the manufacturing of ink, ultrasonic vibrations may be applied in a process of dissolving additives such as dyes.

The intention in applying ultrasonic vibrations consists in that, in order to prevent the ink from producing air bubbles under pressure added to the ink by a recording head, sound wave energy equivalent to or greater than the energy the ink incurs at the recording head is applied to the ink during the manufacturing process and thereby air bubbles are eliminated in advance from the ink.

The frequency of ultrasonic vibrations applied is usually at least 20 kHz, preferably at least 40 kHz, and far preferably at least 50 kHz. The energy applied to an ink solution by ultrasonic vibrations is usually at least $2\times10^7$ J/m$^3$, preferably at least $5\times10^7$ J/m$^3$, and far preferably at least $1\times10^8$ J/m$^3$. The time spent on application of ultrasonic vibrations is usually of the order of 10 minutes to 1 hour.

The application of ultrasonic vibrations is effective even when it is carried out at any stage of the manufacturing process so far as the stage is subsequent to charge of dyes into a medium. The effect of ultrasonic vibrations is also produced even when the ultrasonic vibrations are applied to ink once stored after preparation of the ink is completed. However, it is preferable to add ultrasonic vibrations at the time of dissolving and/or dispersing dyes into a medium because it can produce greater effect on elimination of air bubbles, and besides, the dissolution and/or dispersion of the dyes into the medium is promoted.

Specifically, ultrasonic vibrations can be applied in or after the step of dissolving and/or dispersing dyes into a medium. In other words, the operation of applying ultrasonic vibrations can be carried out at least once at any time during a period between ink preparation and the completion of ink as a product.

It is appropriate for the mode of dissolving and/or dispersing operation of dyes into a medium to include a step of dissolving dyes into a part of the total medium and a step of mixing the remainder of the medium with the resulting solution. And it is preferable to apply ultrasonic vibrations in either of these steps at least. Far preferably, ultrasonic vibrations are applied at least in the step of dissolving dyes into a part of the total medium.

The step of mixing the remainder of the medium may be a single step or a multistage step.

Further, it is preferable to additionally perform deaeration by heating or under a reduced pressure in the preparation of the present ink. This is because such a deaerating operation can enhance the effect in eliminating air bubbles from the ink. It is appropriate that the step of deaeration by heating or under a reduced pressure be carried out simultaneously with or subsequently to the step of mixing the remainder of the medium.

Examples of an ultrasonic vibration generator usable in the step of applying ultrasonic vibrations include known devices, such as a ultrasonic wave dispersing machine.

In the manufacturing process of the present ink, it is important that a step of eliminating dust as solid particles by filtration is included after the preparation of an ink solution. A filter used in this operation has an effective pore diameter of 1 μm or below, preferably from 0.3 μm down to 0.05 μm, particularly preferably from 0.3 μm down to 0.25 μm. Although materials usable for the filter are various in kind, it is preferable to use a filter made specifically for aqueous solvents in the case of using water-soluble dye ink. In particular, a filter made of a plastic material is used to advantage, because it hardly gives rise to dust. Filtration may be effected by passage through a filter by feeding, or a method of filtering under applied or reduced pressure can be utilized.

After such a filtering operation, air is often taken in the solution. In many cases, bubbles coming from this air also cause distortion of images in inkjet recording. So it is appropriate that the defoaming operation as mentioned above be performed additionally. As to a way of defoaming, the solution after filtration may be allowed to stand still, or may undergo ultrasonic defoaming or reduced-pressure defoaming operation with a commercially available device. In the case of ultrasonic defoaming operation, the suitable operation time is of the order of 30 seconds to 2 hours, preferably 5 minutes to 1 hour.

In order to prevent contamination with dust during those operations, it is appropriate that the operations be performed using clean spaces such as a clean room and a clean bench. To the invention, it is especially advantageous for the operations to be performed in spaces having cleanliness of Class 1000 or below. The term "cleanliness" as used herein refers to the value measured with a dust counter.

The volume of the ink droplets ejected is from 0.1 pl to 100 pl, preferably from 0.5 pl to 50 pl, particularly preferably from 2 pl to 50 pl.

The inkjet recording carried out in the invention is not particularly restricted as to its method of jetting ink, but any of known methods may be adopted. More specifically, methods usable in the invention include a charge control method in which ink is jetted by utilizing an induced electrostatic force, a drop-on-demand method (a pressure pulse method) utilizing piezo element vibration pressure, an acoustic inkjet method in which radiation pressure created by irradiating ink with acoustic beams converted from electric signals is utilized for jetting ink, and a thermal inkjet (bubble jet) method in which bubbles are formed by heating ink and the pressure created thereby is utilized for jetting ink.

In the inkjet recording methods usable in the invention are included a method of jetting a great number of minute-volume droplets of ink low in density referred to as the photo ink, a method of improving image quality by the use of two or more kinds of ink substantially the same in hue but different in density, and a method of using colorless invisible ink. The volume control of ink droplets ejected is carried out mainly by means of a print head.

In the case of a thermal inkjet method, for instance, the volume of the ink droplet ejected can be controlled by structural changes of a print head. More specifically, the desired size of ink droplets ejected can be made by changing sizes of an ink cell, a heating section and a nozzle. In the thermal inkjet method also, it further becomes feasible to make ink droplets having two or more different ejected droplet sizes by installing two or more print heads differing from one another in sizes of their respective heating sections and nozzles.

In the case of the drop-on-demand method using a piezo element, structural changes of a print head used therein makes it possible to change the volume of ink droplets ejected as in the case of the thermal inkjet method. On the other hand, as described hereinafter, it is also possible to make different ejected ink droplet sizes by controlling waveforms of piezo element-driving signals without changing the structure of a print head.

In making droplets of the present ink eject the surface of a recording material, the jet frequency of the ink is adjusted to at least 1 KHz.

In order to record images of photo-like high quality, it is required to reproduce highly sharp images with minute droplets of ink. So it is required that the ink droplet ejection density should be adjusted to at least 600 dpi (dots per inch).

In the case of an inkjet printer of the type which performs recording on a recording paper with ink droplets jetted from a set of heads which each have a plurality of nozzles while moving the recording paper and the head set in directions crossing each other at right angles, the number of heads capable of being driven simultaneously is limited to the order of dozens to 200. Even in a printer equipped with fixed heads referred to as the line head, the number of heads is limited to several hundreds. This is because there is a restriction on driving power and many head nozzles cannot be driven at the same time due to the fact that the heat produced thereby affects images.

Herein, it is possible to increase the recording speed by heightening the driving frequency.

In the case of a thermal inkjet method, the control of the ink droplet ejection frequency is feasible by controlling the frequency of head driving signals for heating the heads.

In the case of a piezo method, such a control is feasible by controlling the frequency of piezo driving signals.

Driving piezo heads is explained below. In a printer control section, the size, the speed and the frequency of the ejected ink droplets are determined according to image signals to be printed, and signals for driving print heads are formed. And the driving signals formed are fed to the print heads. The size, the speed and the frequency of the ejected ink droplet are controlled by signals driving piezo elements. Of those factors of ink droplets, the size and the speed of the ejected ink droplet are determined by the waveform and the amplitude of driving signals, while the frequency is determined by the repetition period of signals.

When the frequency of ejected ink droplet is set at 10 KHz, the head is driven every 100 microseconds and one line of recording is completed in 400 microseconds. By setting the travelling speed of a recording paper at 1/600 inch per 400 microseconds, or about 42 microns, it becomes possible to print at a rate of one sheet per 1.2 seconds.

As the configuration of a printing apparatus and the structure of a printer used in the invention, the conditions as disclosed in JP-A-11-170527 are suitable. And the ink cartridges as disclosed in JP-A-5-229133 can be used to advantage in the invention. As the suction mechanism and the structure of a cap covering a printing head used therein, those disclosed in JP-A-7-276671 are used appropriately in the invention. In addition, it is advantageous to install in the head neighborhood the air bubble elimination filter as disclosed in JP-A-9-277552.

Further, it is favorable to make the nozzle surface water-repellent as disclosed in Japanese Patent Application No. 2001-016738. As to the uses, the invention may be applied to a printer linked to computers, or to apparatus tailored to the printing of photographs.

The control of the speed of the ejected ink droplet is performed by controlling the waveform and the amplitude of head driving signals.

In addition, the use of different waveforms of driving signals makes it possible to change the size of ejected ink droplet in spite of using one head.

The invention will now be illustrated in more detail by the following examples, but these examples should not be construed as limiting the scope of the invention in any way.

EXAMPLE 1

To the following ingredients, deionized water was added in an amount to make the total volume 1 liter, and stirred for 1 hour while heating at a temperature of 30 to 40° C. The resulting solution was passed through a vacuum microfilter 0.25 μm in average pore diameter, thereby preparing a light magenta ink solution LM-101.

| [Formula of Light Magenta Ink Solution LM-101] | |
| --- | --- |
| (Solid Components) | |
| Magenta dye (MD-1) | 7.5 g/l |
| Urea | 37 g/l |
| (Liquid Components) | |
| Diethylene glycol (DEG) | 140 g/l |
| Glycerin (GR) | 120 g/l |
| Triethylene glycol monobutyl ether (TEB) | 120 g/l |
| Triethanolamine (TEA) | 6.9 g/l |
| SURFYNOL STG (SW) | 10 g/l |

Further, a magenta ink solution M-101 was prepared in the same manner as the light magenta ink solution LM-101, except that the amount of magenta dye (MD-1) was increased to 23 g/l.

| [Formula of Magenta Ink Solution M-101] | |
| --- | --- |
| (Solid Components) | |
| Magenta dye (MD-1) | 23 g/l |
| Urea | 37 g/l |
| (Liquid Components) | |
| Diethylene glycol (DEG) | 140 g/l |
| Glycerin (GR) | 120 g/l |
| Triethylene glycol monobutyl ether (TEB) | 120 g/l |
| Triethanolamine | 6.9 g/l |
| SURFYNOL STG | 10 g/l |

Ink solutions LM-102 to LM-108 and ink solutions M-102 to M-108 were prepared in the same manner as the ink solutions LM-101 and M-101 respectively, except that their individual additives set forth in Table 1 were added to the foregoing compositions respectively.

The structural formula of the magenta dye MD-1 is illustrated below:

TABLE 1

MD-1

[Chemical structure of MD-1 with SO₃K, CN, CH₃, SO₃Na, HN, SO₃K, SO₃Na groups]

Additive

| | |
|---|---|
| LM-101 and M-101 (comparison) | not added |
| LM-102 and M-102 (comparison) | 10 g/l of POEP-1 added to LM-101 and M-101 |
| LM-103 and M-103 (comparison) | 10 g/l of POEN-1 added to LM-101 and M-101 |
| LM-104 and M-104 (invention) | 10 g/l of X-1 added to LM-101 and M-101 |
| LM-105 and M-105 (invention) | 10 g/l of X-3 added to LM-101 and M-101 |
| LM-106 and M-106 (invention) | 10 g/l of X-6 added to LM-101 and M-101 |
| LM-107 and M-107 (invention) | 10 g/l of X-10 added to LM-101 and M-101 |
| LM-108 and M-108 (invention) | 10 g/l of X-13 added to LM-101 and M-101 |

POEP-1: Polyoxyethylene nonyl phenyl ether (average number of oxyethylene units: 30)
POEN-1: Polyoxyethylene naphthyl ether (average number of oxyethylene units: 50)

Each of these sets of light magenta and magenta ink solutions were charged into the light magenta and magenta ink cartridges of an inkjet printer Model PM-950C, made by Seiko Epson Corporation. As to the ink of the other colors, the ink cartridges sold for use in PM-950C were used as they were. Monochromatic images of magenta color were printed with the printer loaded with these ink cartridges. The image-receiving sheets used in this printing operation were photograph-specific paper sheets, Inkjet Paper PM, made by Seiko Epson Corporation. The thus printed images were examined for the extent to which they became blurred under a high humidity condition.

(Experiment for Evaluation)

Magenta images were printed in a pattern that 4 solid square images with dimensions of 3 cm×3 cm were arranged in a 2 by 2 matrix with the 1 mm-wide white gap between adjacent squares, and allowed to stand for 72 hours under a condition of 25° C.-90% RH. Thereafter, observations of bleeding of the magenta dye to the white gap were carried out. When the increment in a magenta density of the white gap, compared with the magenta density just after printing, was 0.01 or below as measured with a magenta filter of Status A, the bleeding of the magenta dye was rated A. When the increment was within the range of 0.01 to 0.051, the bleeding of the magenta dye was rated B. And the bleeding of the magenta dye was rated C when the increment was 0.05 or above.

The evaluation results obtained are shown in Table 2.

TABLE 2

| | Magenta Ink Bleed |
|---|---|
| Genuine EPSON ink (for PM-950C) | B |
| LM-101 and M-101 (comparison) | C |
| LM-102 and M-102 (comparison) | C |
| LM-103 and M-103 (comparison) | C |
| LM-104 and M-104 (invention) | A |
| LM-105 and M-105 (invention) | A |
| LM-106 and M-106 (invention) | A |
| LM-107 and M-107 (invention) | A |
| LM-108 and M-108 (invention) | A |

As can be seen from Table 2, each of ink sets according to the invention is superior from all the comparative ink sets in magenta ink bleed.

EXAMPLE 2

To the following ingredients, deionized water was added in an amount to make the total volume 1 liter, and stirred for 1 hour while heating at a temperature of 30 to 40° C. The resulting solution was passed through a vacuum microfilter 0.25 μm in average pore diameter, thereby preparing a light cyan ink solution LC-101.

| [Formula of Light Cyan Ink Solution LC-101] | |
|---|---|
| (Solid Components) | |
| Cyan dye (CD-1) | 17.5 g/l |
| Proxel | 3.5 g/l |
| (Liquid Components) | |
| Diethylene glycol | 150 g/l |
| Glycerin | 130 g/l |
| Triethylene glycol monobutyl ether | 130 g/l |
| Triethanolamine | 6.9 g/l |
| SURFYNOL STG (SW: nonionic surfactant) | 10 g/l |

Further, a cyan ink solution C-101 was prepared in the same manner as the light cyan ink solution LC-101, except that the amount of cyan dye (CD-1) was increased to 68 g/l.

| [Formula of Cyan Ink Solution C-101] | |
|---|---|
| (Solid Components) | |
| Cyan dye (CD-1) | 68 g/l |
| Proxel | 3.5 g/l |
| (Liquid Components) | |
| Diethylene glycol | 150 g/l |
| Glycerin | 130 g/l |
| Triethylene glycol monobutyl ether | 130 g/l |
| Triethanolamine | 6.9 g/l |
| SURFYNOL STG | 10 g/l |

Ink solutions LC-102 to LC-108 and ink solutions C-102 to C-108 were prepared in the same manner as the ink solutions LC-101 and C-101 respectively, except that their individual additives set forth in Table 3 were added to the foregoing compositions respectively.

The structural formula of the cyan dye CD-1 is illustrated below:

TABLE 3

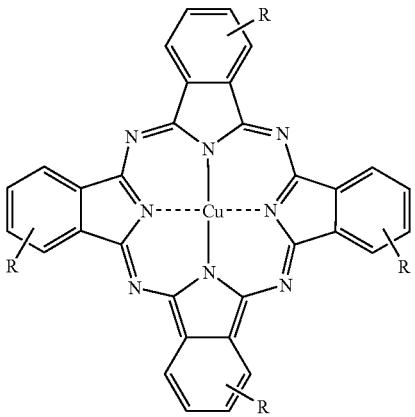

R:SO$_2$CH$_2$CH$_2$CH$_2$SO$_3$Li

| Additive | |
|---|---|
| LC-101 and C-101 (comparison) | not added |
| LC-102 and C-102 (comparison) | 10 g/l of POEP-1 added to LC-101 and C-101 |
| LC-103 and C-103 (comparison) | 10 g/l of POEN-1 added to LC-101 and C-101 |
| LC-104 and C-104 (invention) | 10 g/l of X-1 added to LC-101 and C-101 |
| LC-105 and C-105 (invention) | 10 g/l of X-4 added to LC-101 and C-101 |
| LC-106 and C-106 (invention) | 10 g/l of X-8 added to LC-101 and C-101 |
| LC-107 and C-107 (invention) | 10 g/l of X-11 added to LC-101 and C-101 |
| LC-108 and C-108 (invention) | 10 g/l of X-14 added to LC-101 and C-101 |

POEP-1: Polyoxyethylene nonyl phenyl ether (average number of oxyethylene units: 30)
POEN-1: Polyoxyethylene naphthyl ether (average number of oxyethylene units: 50)

Each of these sets of light cyan and cyan ink solutions were charged into the light cyan and cyan ink cartridges of an inkjet printer Model PM-950C made by Seiko Epson Corporation. On each of cyan solid images (densities of which were 1.0, 1.5 and 2.0 respectively), a pattern of EPSON black ink was printed in the same form as a Chinese character of complicated strokes signifying "black". After 72-hour storage under a condition of 40° C.-85% RH, the pattern was visually examined for blur. In this examination, the ink set was rated A when the pattern was perceived to be free of blur, it was rated B when the pattern was perceived to become somewhat blurred, and it was rated C when the narrow gaps between strokes in the upper part of the Chinese character were perceived to be bridged. The results obtained are shown in Table 4.

TABLE 4

| | Cyan Ink Bleed |
|---|---|
| Genuine EPSON ink (for PM-950C) | B |
| LC-101 and C-101 (comparison) | C |
| LC-102 and C-102 (comparison) | C |
| LC-103 and C-103 (comparison) | C |
| LC-104 and C-104 (invention) | A |
| LC-105 and C-105 (invention) | A |
| LC-106 and C-106 (invention) | A |
| LC-107 and C-107 (invention) | A |
| LC-108 and C-108 (invention) | A |

As can be seen from Table 4, each of the present ink sets was superior to the comparative ink sets in blur of black ink pattern printed on cyan ink.

According to embodiments of the invention, it is possible to provide inkjet recording ink, inkjet recording ink sets and an inkjet recording method which are each resistant to image blur even under high humidity conditions.

The entire disclosure of each and every foreign patent application from which the benefit of foreign priority has been claimed in the present application is incorporated herein by reference, as if fully set forth.

What is claimed is:

1. An ink for inkjet recording, comprising a dye, water, a water-miscible organic solvent and a precursor of acid; wherein the precursor of acid is a compound showing no acidity at the time of preparation and storage of the ink, but is capable of releasing acids by a reaction after aging or printing, or is capable of rendering the ink system acidic as a result of the reaction, and the precursor of acid includes at least one compound represented by the following formulae (1) to (2):

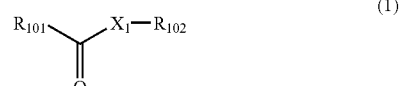

(1)

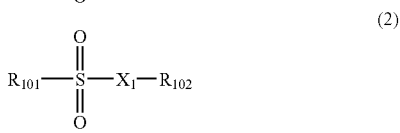

(2)

(3)

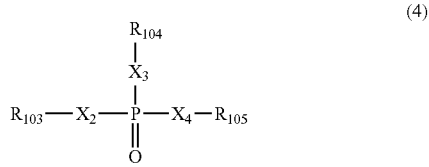

(4)

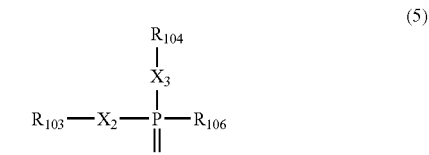

(5)

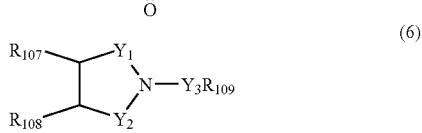

(6)

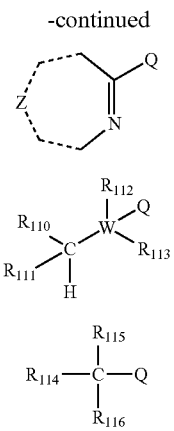

wherein $R_{101}$ represents an alkyl group, an alkenyl group, an alkynyl group, an aryl group, a heterocyclic group, an amino group, an alkoxy group, an aryloxy group, an alkylthio group or an arylthio group, and the groups may have a substituent;

$R_{102}$ to $R_{106}$ and $R_{109}$ each represent an alkyl group, an alkenyl group, an alkynyl group, an aryl group or heterocyclic group, and the groups may have a substituent;

$R_{107}$ and $R_{108}$ each represent a hydrogen atom, a chemical bond forming a double bond by being linked together, a halogen atom, an alkyl group, an alkenyl group, an alkynyl group, an aryl group or a heterocyclic group, and the groups may have a substituent, and two of $R_{107}$ and $R_{108}$ may form a ring by combining with each other;

$X_1$ to $X_4$ each represent an oxygen atom, a nitrogen atom, a sulfur atom, or a group represented by —N($R_{119}$)— O— or —O—N($R_{119}$)—; $R_{119}$ represents a hydrogen atom, an alkyl group, an aryl group or a heterocyclic group;

$Y_1$ to $Y_3$ each represent a carbonyl group, a sulfonyl group, or a group represented by —PO($R_{120}$)$R_{121}$; $R_{120}$ and $R_{121}$ each represent an alkyl group, an aryl group, a heterocyclic group, an amino group, an alkoxy group, an aryloxy group, an alkylthio group or an arylthio group;

Z represents atoms capable of forming an aromatic heterocyclic ring; Q represents a halogen atom, an alkoxy group, an aryloxy group, an alkylthio group, an arylthio group, an amino group, an acyloxy group, an alkylsulfonyloxy group or an arylsulfonyloxy group:

W represents a carbon atom or a nitrogen atom; Q has the same definition as described above; $R_{110}$ and $R_{111}$ each represent a hydrogen atom, a halogen atom, an alkyl group, an aryl group, a heterocyclic group, an amino group, an alkoxy group, an aryloxy group, an alkylthio group, an arylthio group, an acyl group, an alkylsulfonyl group or an arylsulfonyl group;

$R_{112}$ and $R_{113}$ each represent a hydrogen atom, a halogen atom, or an alkyl group, an aryl group, a heterocyclic group, an alkoxy group, an aryloxy group, an alkylthio group, an arylthio group, an acyl group, an alkylsulfonyl group or an arylsulfonyl group;

Q has the same definition as described above; $R_{114}$ represents an alkyl group, an aryl group, a heterocyclic group, an acyl group, an alkylsulfonyl group, an arylsulfonyl group, a phosphoric acid group, an alkylphosphonic acid group, an arylphosphonic acid group, a dialkylphosphonic acid group or a diarylphosphonic acid group; and $R_{115}$ and $R_{116}$ each represent a hydrogen atom, a halogen atom, an alkyl group, an aryl group, a heterocyclic group, an amino group, an alkoxy group, an aryloxy group, an alkylthio group, an arylthio group, an acyl group, an alkylsulfonyl group or an arylsulfonyl group; and the ink comprises the precursor of acid in an amount of 0.01 to 20 wt %.

2. The ink for inkjet recording according to claim 1, which further comprises a surfactant.

3. The ink for inkjet recording according to claim 1, which is an aqueous solution ink, in which the dye is a water-soluble dye.

4. An ink set comprising the ink according to claim 1.

5. An inkjet recording method, which comprises recording an image with an inkjet printer using the ink according to claim 1.

6. An inkjet recording method, which comprises recording an image with an inkjet printer by jetting ink from a print head utilizing the ink set according to claim 3.

7. An ink for ink jet recording according to claim 1, wherein $R_{101}$ represents an alkyl, aryl or heterocyclic group, which is substituted with an electron attracting group.

8. An ink for ink jet recording according to claim 1, wherein $R_{102}$ represents an alkyl, aryl or heterocyclic group, which is substituted with an electron attracting group.

9. An ink for ink jet recording according to claim 1, wherein $R_{103}$ represents an alkyl, aryl or heterocyclic group, which is substituted with an electron attracting group.

10. An ink for ink jet recording according to claim 1, wherein $R_{106}$ represents an alkyl, aryl or heterocyclic group, which is substituted with an electron attracting group.

11. An ink for ink jet recording according to claim 1, wherein the ink comprises the precursor of acid in an amount of 0.5 to 5% by weight.

12. An ink for ink jet recording according to claim 2, wherein the ink comprises the surfactant in an amount of 0.01 to 5% by weight.

* * * * *

UNITED STATES PATENT AND TRADEMARK OFFICE
CERTIFICATE OF CORRECTION

| | | |
|---|---|---|
| PATENT NO. | : 7,052,534 B2 | Page 1 of 4 |
| APPLICATION NO. | : 10/617818 | |
| DATED | : May 30, 2006 | |
| INVENTOR(S) | : Toshiki Taguchi | |

It is certified that error appears in the above-identified patent and that said Letters Patent is hereby corrected as shown below:

In column 38, please amend claim 1 to read as follows:

1. (previously presented): An ink for inkjet recording, comprising a dye, water, a water-miscible organic solvent and a precursor of acid;

wherein the precursor of acid is a compound showing no acidity at the time of preparation and storage of the ink, but is capable of releasing acids by a reaction after aging or printing, or is capable of rendering the ink system acidic as a result of the reaction, and the precursor of acid includes at least one compound represented by the following formulae (1) to (9):

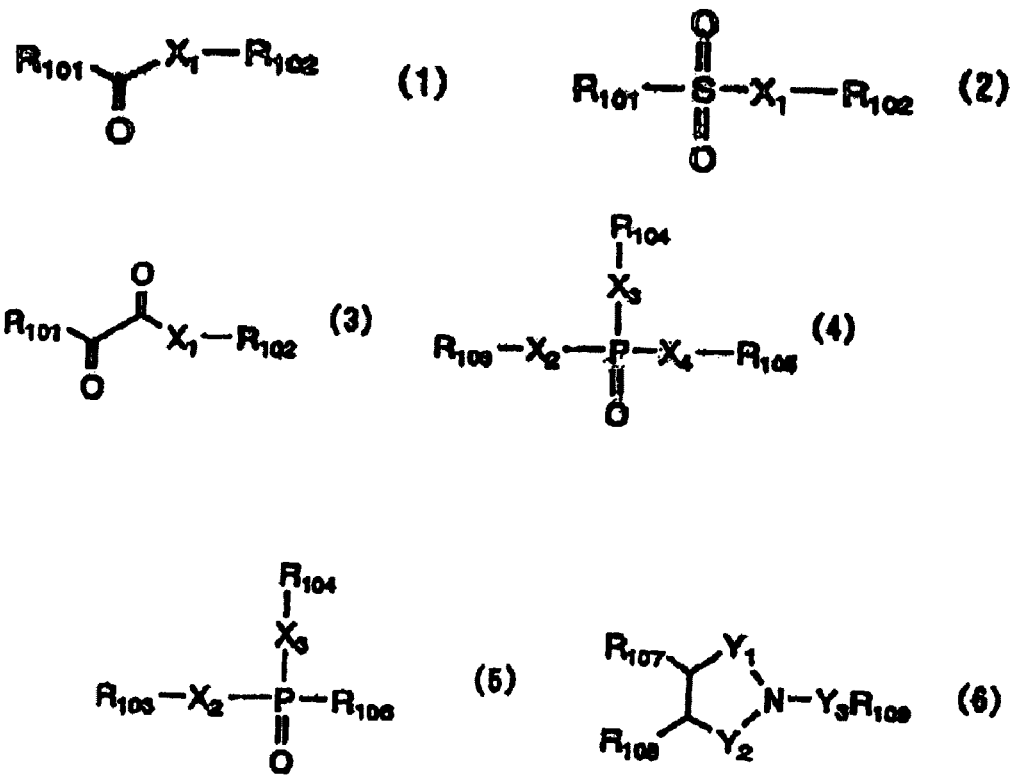

UNITED STATES PATENT AND TRADEMARK OFFICE
CERTIFICATE OF CORRECTION

| | | |
|---|---|---|
| PATENT NO. | : 7,052,534 B2 | Page 2 of 4 |
| APPLICATION NO. | : 10/617818 | |
| DATED | : May 30, 2006 | |
| INVENTOR(S) | : Toshiki Taguchi | |

It is certified that error appears in the above-identified patent and that said Letters Patent is hereby corrected as shown below:

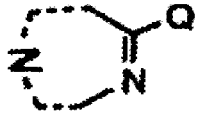 (7)   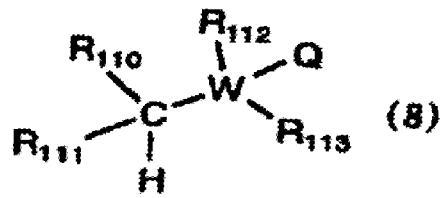 (8)

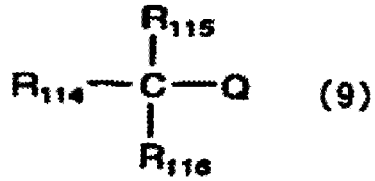 (9)

wherein $R_{101}$ represents an alkyl group, an alkenyl group, an alkynyl group, an aryl group, a heterocyclic group, an amino group, an alkoxy group, an aryloxy group, an alkylthio group or an arylthio group, and the groups may have a substituent;

$R_{102}$ to $R_{106}$ and $R_{109}$ each represent an alkyl group, an alkenyl group, an alkynyl group, an aryl group or heterocyclic group, and the groups may have a substituent;

$R_{107}$ and $R_{108}$ each represent a hydrogen atom, a chemical bond forming a double bond by being linked together, a halogen atom, an alkyl group, an alkenyl group, an alkynyl group, an aryl group or a heterocyclic group, and the groups may have a substituent, and two of $R_{107}$ and $R_{108}$ may form a ring by combining with each other;

UNITED STATES PATENT AND TRADEMARK OFFICE
CERTIFICATE OF CORRECTION

| | |
|---|---|
| PATENT NO. | : 7,052,534 B2 |
| APPLICATION NO. | : 10/617818 |
| DATED | : May 30, 2006 |
| INVENTOR(S) | : Toshiki Taguchi |

It is certified that error appears in the above-identified patent and that said Letters Patent is hereby corrected as shown below:

$X_1$ to $X_4$ each represent an oxygen atom, a nitrogen atom, a sulfur atom, or a group represented by $-N(R_{119})$-O- or -O-$N(R_{119})$-; $R_{119}$ represents a hydrogen atom, an alkyl group, an aryl group or a heterocyclic group;

$Y_1$ to $Y_3$ each represent a carbonyl group, a sulfonyl group, or a group represented by $-PO(R_{120})R_{121}$; $R_{120}$ and $R_{121}$ each represent an alkyl group, an aryl group, a heterocyclic group, an amino group, an alkoxy group, an aryloxy group, an alkylthio group or an arylthio group;

Z represents atoms capable of forming an aromatic heterocyclic ring; Q represents a halogen atom, an alkoxy group, an aryloxy group, an alkylthio group, an arylthio group, an amino group, an acyloxy group, an alkylsulfonyloxy group or an arylsulfonyloxy group:

W represents a carbon atom or a nitrogen atom; Q has the same definition as described above; $R_{110}$ and $R_{111}$ each represent a hydrogen atom, a halogen atom, an alkyl group, an aryl group, a heterocyclic group, an amino group, an alkoxy group, an aryloxy group, an alkylthio group, an arylthio group, an acyl group, an alkylsulfonyl group or an arylsulfonyl group;

$R_{112}$ and $R_{113}$ each represent a hydrogen atom, a halogen atom, or an alkyl group, an aryl group, a heterocyclic group, an alkoxy group, an aryloxy group, an alkylthio group, an arylthio group, an acyl group, an alkylsulfonyl group or an arylsulfonyl group;

UNITED STATES PATENT AND TRADEMARK OFFICE
CERTIFICATE OF CORRECTION

PATENT NO. : 7,052,534 B2
APPLICATION NO. : 10/617818
DATED : May 30, 2006
INVENTOR(S) : Toshiki Taguchi It is certified that error appears in the above-identified patent and that said Letters Patent is hereby corrected as shown below:

Q has the same definition as described above; $R_{114}$ represents an alkyl group, an aryl group, a heterocyclic group, an acyl group, an alkylsulfonyl group, an arylsulfonyl group, a phosphoric acid group, an alkylphosphonic acid group, an arylphosphonic acid group, a dialkylphosphonic acid group or a diarylphosphonic acid group; and $R_{115}$ and $R_{116}$ each represent a hydrogen atom, a halogen atom, an alkyl group, an aryl group, a heterocyclic group, an amino group, an alkoxy group, an aryloxy group, an alkylthio group, an arylthio group, an acyl group, an alkylsulfonyl group or an arylsulfonyl group; and the ink comprises the precursor of acid in an amount of 0.01 to 20 wt%.

Signed and Sealed this

Tenth Day of June, 2008

JON W. DUDAS
*Director of the United States Patent and Trademark Office*